US011367042B2

(12) United States Patent
Wu et al.

(10) Patent No.: US 11,367,042 B2
(45) Date of Patent: Jun. 21, 2022

(54) COMPUTERIZED INVENTORY REDISTRIBUTION CONTROL SYSTEM

(71) Applicant: ORACLE INTERNATIONAL CORPORATION, Redwood Shores, CA (US)

(72) Inventors: Su-Ming Wu, Waltham, MA (US); Kiran Panchamgam, Bedford, MA (US); Bernard Griffiths, Liberty Township, OH (US)

(73) Assignee: Oracle International Corporation, Redwood Shores, CA (US)

( * ) Notice: Subject to any disclaimer, the term of this patent is extended or adjusted under 35 U.S.C. 154(b) by 28 days.

(21) Appl. No.: 16/375,911

(22) Filed: Apr. 5, 2019

(65) Prior Publication Data
US 2020/0320467 A1 Oct. 8, 2020

(51) Int. Cl.
*G06Q 10/08* (2012.01)

(52) U.S. Cl.
CPC ....... *G06Q 10/087* (2013.01); *G06Q 10/0833* (2013.01); *G06Q 10/0837* (2013.01); *G06Q 10/0838* (2013.01)

(58) Field of Classification Search
CPC ............ G06Q 10/087; G06Q 10/0838; G06Q 10/0833; G06Q 10/0837
See application file for complete search history.

(56) References Cited

U.S. PATENT DOCUMENTS

| 2013/0117062 A1* | 5/2013 | Rangarajan | G06Q 10/06 705/7.25 |
|---|---|---|---|
| 2017/0200104 A1 | 7/2017 | Kannan et al. | |
| 2018/0218312 A1 | 8/2018 | Smith et al. | |
| 2019/0122176 A1 | 4/2019 | Wu et al. | |
| 2019/0259043 A1* | 8/2019 | Koneri | G06N 7/005 |

OTHER PUBLICATIONS

Chang, A Multi-category Emergency Goods Distribution Model and Its Algorithm, 2008, IEEE, pp. 1491-1493 (Year: 2008).*
Oracle, Returns Logistics, Oracle Retail Advanced Science Cloud Services Implementation Guide, Mar. 2017, pp. 13-1-13-2, Oracle Corp., US.

(Continued)

*Primary Examiner* — Sangeeta Bahl
*Assistant Examiner* — Aaron N Tutor
(74) *Attorney, Agent, or Firm* — Kraguljac Law Group, LLC

(57) ABSTRACT

One example of computerized inventory redistribution control includes, for each location inventory record in a set of location inventory records, calculating a quantity change that will bring a current item quantity to a different item quantity for the location inventory record. Determining a cost of a minimum-cost redistribution among the physical locations to effect the quantity changes. Determining a scaling factor that maximizes total revenue when the quantity changes are scaled by the scaling factor after deducting the cost scaled by the scaling factor. Generating transfer instructions for a redistribution of the item by scaling the transfer quantities of the minimum-cost redistribution by the scaling factor. Transmitting each transfer instruction to a computing device associated with a physical location indicated in the transfer instruction.

20 Claims, 6 Drawing Sheets

(56) References Cited

OTHER PUBLICATIONS

Patent Cooperation Treaty (PCT) International Search Report and Written Opinion issued in PCT International Application No. PCT/US2020/023582, PCT International Filing Date Mar. 19, 2020, dated May 7, 2020.
De Koster, "Logistic Infrastructure Automated and Robotic Warehouses: Developments and Research Opportunities", Past and Future. Perspectives on Material and Handling, Feb. 1, 2018, pp. 121-132.

* cited by examiner

COMPUTERIZED INVENTORY REDISTRIBUTION CONTROL SYSTEM

BACKGROUND

Retailers often offer generous return policies in many categories of merchandise. Though practices vary among retailers, the policies may be generous enough that returns can cause an imbalance of inventory at a store or warehouse location, particularly when a return policy allows a customer to return purchased merchandise to any store in a retail chain. For example, a customer may return an item to a store that already has too much of the item, or even to a store that does not sell the item at all.

This problem is exacerbated when retailers with brick-and-mortar stores also sell online but allow a customer to return merchandise purchased online to the brick-and-mortar stores. Typically, the rate of returns from online purchases is greater than the rate of returns from in-store purchases. Customers may have difficulty judging the functionality or the appearance of an item from the pictures and description displayed by the retailer's website, leading to common complaints such as "I thought it would look different" or "it doesn't fit well," or "it won't do what I need it to do." This uncertainty about the functionality or appearance may lead customers to order more than one version of a product, and return the one that they don't want. For example, in clothing retail, a customer may order several sizes of an item, and then return the ones that do not fit. Or, the customer may order the same style of item in several colors because they want to examine the color in person, and then return the items in colors that they do not like.

The combination of online sales and return-to-store policies can cause significant store inventory imbalances. Inventory imbalances can be dealt with in one of the following ways: (1) Send the item from the store where the item was returned back to a distribution center (DC), where the item will be sent to a store that can sell the item. (2) Keep the item at the store where the item was returned, and attempt to sell the item at a satisfactory price at the store. (3) Do a store-to-store shipment to transfer the item from the store where the item was returned directly to another store where the item might be sold for a better price. In a variation of approach (3), the retailer can make the inventory of the store where the item was returned available to online purchasers, and fulfill an online order for the item with the returned item.

Deciding among the three alternative approaches is a complex decision. Therefore, retailers typically use only one of these approaches, use generalized rules of thumb to decide between approaches, or otherwise exercise their own judgement. This does not necessarily lead to the best result. For example, in approach (2), it may be better to use a different store to sell the returned item if the item is not selling well at the store the item was returned to. The retailer must re-sell returned items while minimizing cost of doing so in order to maximize revenue. But, as the number of item returns grows, so too does the expense associated with inventory imbalances. These costs may not be accounted for by all approaches. For example, in approach (1), where the retailer always sends the goods back to the DC, the cost of doing so could exceed the revenue from selling the item, and it may have been better to sell the item from the store that the item was returned to. Some retailers may take approach (3), but in practice, this approach is not practical to carry out manually due to the number of stores and the quantity of returned merchandise. And, even if approach (3) is carried out by automation, prior techniques were inaccurate, untimely, and typically did not consider the cost of store-to-store transfers.

Further, there is an aspect of time sensitivity to correcting inventory imbalances, depending on the type of merchandise. For example, in clothing, the current season's fashions need to be sold within the season, thus requiring the retailer to use all possible avenues to clear the current season's inventory within the current season. This is in contrast to non-clothing retail, where redistributing of inventory is less important because there is usually no time-limit on selling the item.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
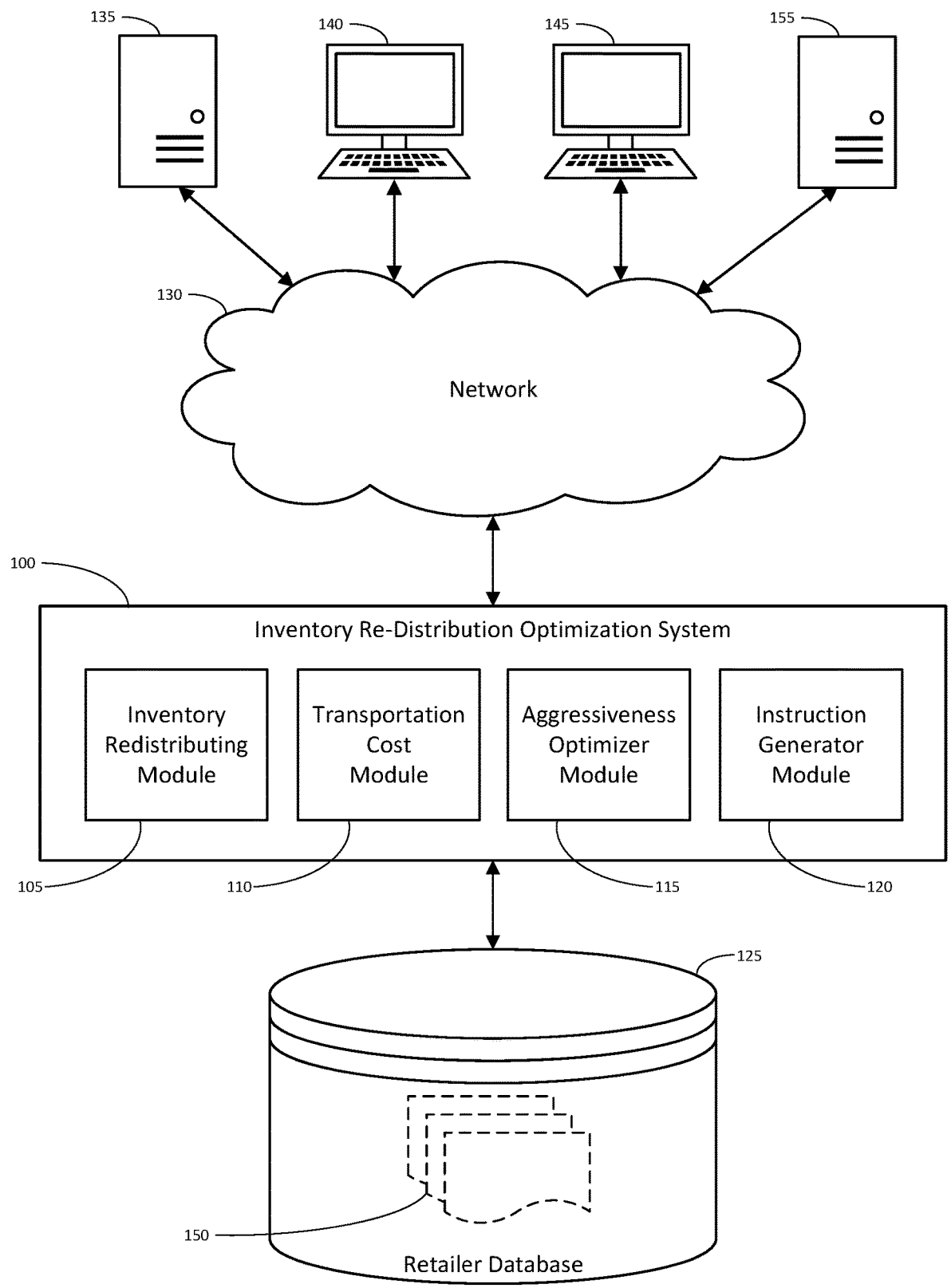
FIG. 1 illustrates one embodiment of a system associated with maximizing revenue from re-selling returned items having a fixed life time.

Systems and methods are described herein for computerized inventory redistribution control. In one embodiment, a computerized inventory redistribution control system and method is presented for redistributing quantities of an item from physical locations with an excess of the item to physical locations with a deficit of the item. In one embodiment, a computerized inventory redistribution control system and method is presented for periodically determining redistributions of returns that have arrived in stores of the retail chain. In one embodiment, redistributing means moving the inventory for the item from store to store. For example, this may involve decreasing inventory for the item at a store where the item is selling poorly to a store where the item is selling well, or at least better than the store where the item is selling poorly, in an attempt to increase total revenue received from the sales.

The problem of how to redistribute inventory among physical locations involves solving two problems. One, a transportation problem: given target inventory levels for each physical location of a retail chain, identify the set of individual shipments between the physical locations that results in reaching (as closely as possible) the target inventory quantities of each store at the minimum total shipping cost. Two, a price optimization problem: given the inventory at each store of a retail chain, find the sales prices that maximize the revenue from selling the entire inventory.

But it was not previously possible to reach an optimized solution to redistribute inventory among stores while simultaneously maximizing revenue. Prior systems solve the transportation problem and price optimization problem separately and independently, but the two problems are intertwined.

First, allocating more of an item to a store may require the store to lower prices in order to sell the entire inventory of the item, resulting in lower revenue per unit. It may therefore be beneficial to redistribute excess inventory of the item among multiple stores, so that each store need not lower price too much in order to sell out its inventory of the item. Thus, with less need to lower prices, revenue per unit of the item is increased.

Second, redistributing excess inventory across stores incurs a transportation cost to transfer the inventory from store to store. This transportation cost should be balanced against the increase in revenue per unit achieved by the redistribution. It is possible that the increase in revenue will be counteracted or even overwhelmed by the cost of performing the individual store-to-store transfers. In such situations, it may be desirable to be less aggressive about redistributing inventory, even though the resulting total revenue is lower.

The methods and systems disclosed herein balance cost of redistribution against increase in revenue, and only redistributes items if the increase in revenue outweighs the cost of the redistribution. By solving the transportation problem and price optimization problem interdependently and simultaneously, a better solution is reached than when these problems were solved independently and separately.

Further, some items have a fixed life time, meaning that stores have to get rid of the item by a particular date. For example, such items with a fixed life time include fashion items such as clothing, shoes, and fashion accessories, which should be out of the store by, or shortly after, the end of a fashion season. This date may differ from store to store in a retail chain. For example, the end of the spring fashion season may be later for stores in colder climates than for stores in warmer climates. In another example, such items with a fixed lifetime include holiday-themed items, such as holiday candy and decorations, which should be out of the store by, or shortly after, the associated holiday. This date is likely to remain consistent between the stores of a chain, except where the holiday may be celebrated at different times at the different locations of the stores. For example, the end of the season for Thanksgiving-themed merchandise may end in October for Canadian store locations, but will end in November for United States store locations.

In one embodiment, the price optimization problem is further to find the sales prices that maximize the revenue from selling the entire inventory by a specific date. The requirement to sell the entire inventory of an item by a specific date reflects items with a fixed life time. Prior solutions do not account for the fixed lifetime of fashion and/or seasonal items, and accounting for the specific date reflects an improvement beneficial to retailers of fashion and/or seasonal items.

In one embodiment, the price optimization accounts for the full lifecycle of the item, including markdowns and promotions. The price optimization is thus a detailed one that includes most actions that a retailer may take when selling. Accounting for full lifecycle of the item in price optimization may yield a more accurate calculation of the obtainable revenue, which in turn further improves the ability to select the proper stores when solving the transportation part of this problem.

Example System Environment

FIG. 1 illustrates one embodiment of an inventory redistribution control 100 for redistributing limited-lifetime inventory to obtain optimum profit. The inventory redistribution control system 100 includes an inventory redistributing module 105, a transportation cost module 110, an aggressiveness optimizer module 115, and an instruction generator module 120. Input and output information from inventory redistribution control system 100, including each of the modules 105, 110, 115, and 120, can be stored by a retailer database 125. Inventory redistribution control system 100 may communicate through a network 130 with remote computing systems, such as one or more computing device(s) 135 associated with a retailer.

The remote computing systems may also include one or more computing devices 140 associated with a source physical location of a retailer that is a source for redistributed items; one or more computing devices 145 associated with a destination physical location of a retailer that is a destination for redistributed items. The physical locations of the retailer associated with computing devices 140 and 145 may each be both a source and destination for redistributed items. The physical locations of the retailer may include, but are not limited to retail stores, kiosks, fulfillment centers, warehouses, distribution centers, returns processing centers, and other locations where inventory may be present.

In one embodiment, each physical location of a retailer is associated with one or more location inventory records 150 stored as data structure(s) in retailer database 125. Each physical location of the retailer may have one or more items of a given type in its inventory. The location inventory records 150 include a current item quantity for the item. Each location inventory record 150 may, in one embodiment, be a location inventory record for a single type of item in inventory at a single selected physical location. Alternatively, each location inventory record 150 may, in one embodiment, be a location inventory record for all types of item in inventory at a single selected physical location.

The data (such as current item quantity for an item) included in the location inventory records 150 in retailer database 125 may be populated by inputs from remote computing systems, such as computing devices 135 associated with a retailer, computing devices associated with physical locations of a retailer, such as computing devices 140 and 145, or even by a third-party computing system 155. In one embodiment, computing device 135 associated with a retailer provides an initial current item quantity of an item for each physical location with the item, based on an initial distribution of the item. Computing devices associated with physical locations, such as computing devices 140 and 145, update the current item quantity in the location inventory records 150 as the amount of the item at each physical location associated with the computing device changes. The current inventory of an item at a physical location may decrease due to sales, inventory shrinkage or damage, or redistributing of inventory. The current inventory of an item at a physical location may increase due to returns, resupply of an item, or redistributing of inventory. For increase or decrease, the current item quantity in the associated location inventory records 150 is updated. Thus, the current item quantity in each location inventory record 150 reflects the total saleable inventory of an item, including any returned item from the previous weeks that were not already shipped out from the physical location.

In some embodiments, information about the price elasticity of each item selling at a physical location may be stored in one or more data structures in retailer database 125 or elsewhere. In one embodiment, the price elasticity for an item selling at a physical location may be stored in the location inventory record of the item for the physical location. In one embodiment, the price elasticity may be calculated by computing systems of the retailer, such as computing device 135 or inventory redistribution control system 100. In another embodiment, the price elasticity may be calculated using third-party computing system 155, and delivered to retailer database 135 through network 130. For example, Oracle® offers suitable software applications to calculate price elasticity, such as the Oracle® Retail Offer Optimization application. The price elasticity may be regularly updated.

In some embodiments, information about the base demand over one or more given time periods (such as for upcoming weeks) for each item selling at a physical location may be stored in one or more data structures in retailer database 125 or elsewhere. Base demand for an item, as used herein, refers to the demand for the item if the item is selling for full price (instead of being discounted). In one embodiment, the base demand may be calculated by computing systems of the retailer, such as computing device 135 or inventory redistribution control system 100. In another embodiment, the base demand may be calculated using a third-party computing system 155, and delivered to retailer database 135 through network 130. For example, the Oracle® Retail Offer Optimization application may be suitable to calculate base demand. Base demand for an item at a physical location may differ for the given time periods (such as upcoming weeks) because the base demand for the item can vary from time period to time period. In one embodiment, the base demand for each time period remaining before the end of an item's life time at each physical location is stored in retailer database 125 or elsewhere.

In some embodiments, information about the cost of shipping one (or more) unit of an item in inventory between each pair of the physical locations of the retailer may be stored in a data structure in retailer database 125 or elsewhere. For example, information about the cost of shipping between the source physical location associated with computing device 140 and the destination physical location associated with computing device 145 may be stored in a data structure in retailer database 125 or elsewhere. For example, this information may be stored in retailer database 125 as a shipping costs table.

This shipping information may be internally determined by computing systems of the retailer, such as computing device 135 or inventory redistribution control system 100, or be available for retrieval through network 130 from the third-party computing system 155.

In some embodiments, information about a set of physical locations among which to redistribute the items may be stored in a data structure in retailer database 125 or elsewhere. For example, this information may be stored in retailer database 125 as a participant locations table. The specific information stored is up to the retailer to determine. But, in one embodiment, the information includes records of the number of returns the physical locations have received, location information (such as address information or map coordinates) of each of the physical locations of the retailer, and electronic routing information to one or more computing devices associated with each of the physical locations. Here, the retailer would choose a set consisting of: (1) physical locations which have received particularly high returns of the item; and (2) other physical locations near the physical locations in (1) that could receive shipments of the item. The set of physical locations can vary each week, as the retailer sees fit and as dictated by the returns that have occurred. This process of selection may be automated, with threshold values for "high"-ness of returns and "near"-ness of the other physical locations dictating the population of groups (1) and (2) above. For example, physical locations with a number of returns above the 75th percentile of returns for all physical locations might be considered "particularly high;" and a radius of 100 miles from each physical location might be set as the outer boundary for one physical location to be considered "near" another. Alternatively, "near"-ness of other physical locations may be based on the stored information about the cost of shipping inventory between each pair of the physical locations, and a cost of $1.00 to ship an item unit from one physical location to another may be set as the upper boundary the locations to be considered "near." These values are purely exemplary and may be changed at the discretion of the retailer. In one embodiment, the selection of the set of physical locations among which to redistribute the items may be performed by computing systems of the retailer, such as computing device 135 or inventory redistribution control system 100.

Any information stored in the databases, data structures, or any table described herein may be retrieved by a processor for use in any of the methods described herein. Further, the processor may write information produced in the course of performing a method to appropriate locations in databases, data structures, or tables described herein.

Example Method

Figure 2:
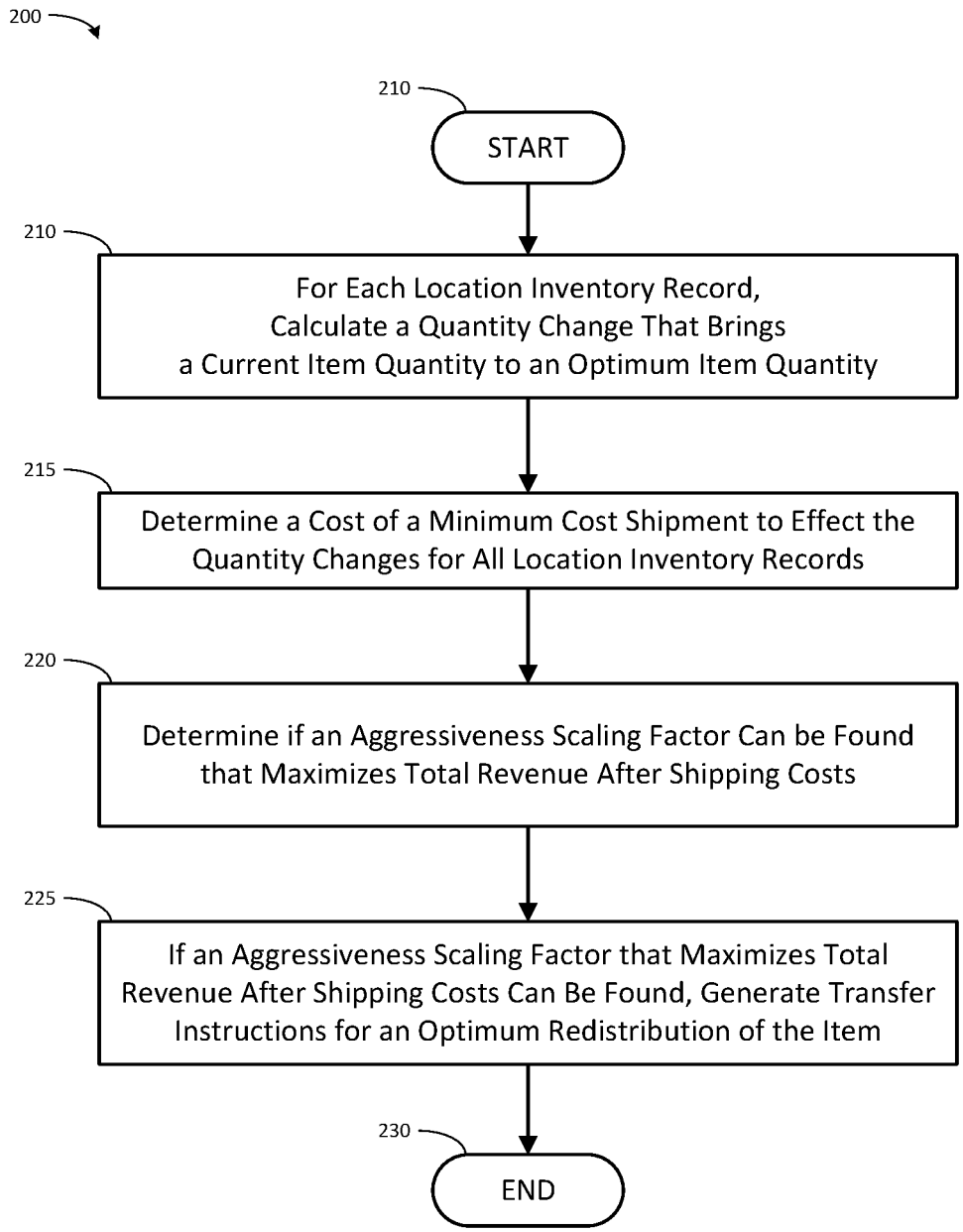
FIG. 2 illustrates one embodiment of a method associated with maximizing revenue from re-selling returned items having a fixed life time.

FIG. 2 shows one embodiment of a computer-implemented method 200 associated with redistributing limited-lifetime inventory to obtain optimum profit. In one embodiment, a computing device (such as computer 605, shown in FIG. 6) with operably connected processor (such as processor 610) and memory (such as memory 615) is implemented with an executable algorithm that configures the processor to perform the method 200 or any other disclosed method herein. Method 200 may be performed by a processor accessing memory to perform the steps described herein, including (i) retrieving any necessary information, (ii) calculating, determining, generating, classifying, or otherwise creating any data, and (iii) storing any data calculated, determined, generated, classified, or otherwise created. In one embodiment, the method 200 may be performed by the inventory redistribution control system 100 of FIG. 1.

The method 200 is performed on an item type by item type basis, handling each item type independently, and generating a recommendation for transfer instructions for the items of each item type independently. The method 200 may be repeated for each item type that the retailer chooses to redistribute in order to achieve a redistributing of all item types in inventory across all physical locations of the retailer.

Thus, the computing performance of the method is important. When the method is performed for all item types in the inventory of a retailer, this can be hundreds or thousands of item types. Further, it is undesirable to wait for a long time for the redistribution instructions, because it is important to begin redistributions as soon as possible. Thus, while it may be possible to implement a more accurate method, the more accurate method will take longer and/or demand more computing resources than of the method 200. The methods described herein achieve a reasonable balance between the need for speed and the expense of computing resources.

The method 200 may be initiated based on various triggers, such as receiving a signal over network 130 (or parsing data stored, for example, in retailer database 125) indicating that (i) that a user of the inventory redistribution control system 100 has initiated method 200, or (ii) that that method 200 is scheduled to be initiated at defined times or time intervals. In some embodiments, the method is initiated on a periodic schedule (daily, weekly, bi-weekly, monthly, etc.) during the life cycle of an item at the retailer, in accordance with trigger (ii) above. In some embodiments, a weekly initiation and run of the method 200 strikes a good balance between the accumulation of inventory imbalances, shipping costs, and the life cycle of the item. In other embodiments, a shorter or longer period may be indicated. For example, vehicle sales have a longer life cycle (such as the vehicle model year) and potentially lower sales volume than a fashion item, and may therefore indicate a shorter period for the scheduled operation of the method 200. While the periodic schedule of the method 200 is left to discretion of the retailer, the method 200 is discussed herein with reference to weeks as the default configuration. Alternative periods may be substituted for the described weeks.

In one embodiment, the method 200 is initiated at the end of a current week (or other time period), where the term "current week" refers to the week preceding the initiation and running of the method. At the end of the current week, each physical location has a number of remaining weeks in which to sell an item before the end of the fixed life time of the item. For example, the number of remaining weeks may be the weeks remaining until the end of the fashion season for the physical location.

In one embodiment, the inputs to method 200 include the following inputs:

Input—Current Item Quantity. In equations throughout this specification, k is used to denote a physical location, and $I_k$ is used to denote a current item quantity (or inventory) at a physical location k. In one embodiment, an input to the method 200 is a current item quantity $I_k$ for each physical location k of a set of physical locations for which the method 200 is being run. The current item quantity reflects the quantity of the item that is currently in inventory for an associated physical location. In one embodiment, the current item quantity includes the quantity of any returns item received at the physical location before performing method 200 that have not already been sold or shipped out from the physical location. For example, the current item quantity may be a count of all of the type of the item that is in inventory at a store, including any of the item that was returned to the store. In one embodiment, a processor implementing the inventory redistribution control system 100 may retrieve the value of the current item quantity from a location inventory record associated with the physical location in memory or storage in retailer database 125. In one embodiment, each location inventory record may be a data structure associated with a physical location in a set of physical locations. The set of location inventory records may be the set of location inventory records for the item that are associated with a set of physical locations among which to redistribute the items, discussed below.

Input—Price Elasticity. In equations throughout this specification, $\gamma_k$ is used to denote a price elasticity of the item selling at a physical location k. In one embodiment, an input to the method 200 is a price elasticity $\gamma_k$ of the item selling at each physical location k of a set of physical locations for which the method 200 is being run. In one embodiment, a processor implementing the inventory redistribution control system 100 may retrieve the value of the price elasticity from a data structure associated with a physical location in memory or storage in retailer database 125, such as the location inventory record associated with the physical location in retailer database 125. Throughout this specification, the price elasticity of an item selling at a physical location is assumed to be greater than 1. ($\gamma_k$>1). This is a standard assumption from economic theory. For each periodic run of the method 200, the retailer may update the price elasticity values with the latest available price elasticity values before the run of the method 200, for example by replacing the prior values in retailer database 125. Because each run of the method 200 is independent, the method 200 can therefore use the latest available data.

Input—Base Demand. In equations throughout this specification, w is used to denote a remaining week w, where the weeks remaining following the current week for the sale of the item before the end of the fixed life time of the item at a physical location k are numbered from 1 through $W_k$; and $b_{kw}$ is used to denote a base demand for the item at a physical location k during remaining week w (for example, $b_{k1}$ is the demand for the item at physical location k for the next week). In one embodiment, an input to the method 200 is a base demand $b_{kw}$ for the item selling at each physical location k of the set of physical locations during each week remaining w following the running of the method 200 before the end of the fixed life time of the item at the physical location. Thus, the base demand for each physical location may be expressed as a set of values, one reflecting the base demand for each week following the run of method 200 until the end of the fixed life time of the item. In one embodiment, the base demand value for all remaining weeks at each location may be required to support the method 200, rather than only the week immediately following the run of method 200. In one embodiment, a processor implementing the inventory redistribution control system 100 may retrieve the value(s) of the base demand from a data structure associated with a physical location in memory or storage in retailer database 125, such as the location inventory record associated with the physical location in retailer database 125.

Input—Shipping Costs. In equations throughout this specification, $c_{sd}$ is used to denote a unit shipping cost for shipping one unit of the item from source physical location s to destination physical location d. In one embodiment, an input to the method 200 is a unit shipping cost $c_{sd}$ for shipping one unit of the item from source physical location s to destination physical location d. In one embodiment, as discussed further below, the source physical location s is a "surplus" physical location, or a location having a surplus of the item, and destination physical location d is a "deficit" physical location, or a location having a deficit of the item. In one embodiment, a processor implementing the inventory redistribution control system 100 may retrieve the values of the shipping costs from a data structure in memory or storage in retailer database 125, such as from the shipping costs table.

Input—Set of Physical Locations. In one embodiment, an input to the method 200 is a set of physical locations K selected (for example, by the retailer) among which to redistribute the items for the run of method 200. In one embodiment, a processor implementing the inventory redistribution control system 100 may retrieve the set of physical locations from a data structure in memory or storage in retailer database 125, such as from the participant locations table. In one embodiment, the set of physical locations may be the set of all physical locations of the retailer. In another embodiment, the set of physical locations may be a subset of the set of all physical locations of the retailer.

Note that, in the following descriptions of methods, each variable may be stored in a data structure in in memory or storage, such as in in retailer database 125, for later retrieval and use.

Determining Change Quantity for "Surplus" and "Deficit" of the Item

The method 200 initiates at start block 205 in response to parsing a signal received from network 130 or stored data from retailer database 125 and determining that the signal or stored data indicates that the method 200 should begin, and processing continues to process block 210. At process block 210, a processor calculates a quantity change for an item that changes a current item quantity to a different item quantity for the location inventory record for each location inventory record of a set of location inventory records. In one embodiment, the quantity change is one that will bring the current item quantity to an optimum item quantity for the physical location. In one embodiment, the processes of process block 210 may be performed by inventory redistribution control system 100, for example by a processor implementing inventory redistributing module 105.

In some embodiments, process block 210 acts to determine which physical locations in the set of physical locations have a surplus of the item, and which stores have a deficit of the item. Whether a physical location (such as a store) truly has a surplus or deficit is a complex question, because the answer depends on how well the item is selling at each store. For example, even though a store has had several returns of the item, this does not mean the store actually has a surplus of the item since the item might be selling quite well at the store and therefore it is fortuitous that the store now has more of the item to sell. In fact, even with the returns, the store may still have a deficit of the item. In another example, an item may already be selling poorly at a store, and receiving returns further aggravates a surplus of the item at the store.

In each of the above examples, there is a quantity change $c_k$ which can be made to bring the current item quantity $I_k$ at the physical location k to an optimum item quantity for the physical location. This holds true across larger sets of physical locations. The optimum quantity is an amount that approximates the correct amount of inventory to maximize revenue across all physical locations for the inventory possessed by all physical locations.

In one embodiment, the quantity change $c_k$ for each physical location k in a set of physical locations that will bring the current item quantity of each physical location to the optimum quantity for that location is given by Equation (Eq. 1), as follows:

$$c_k = \left[ \left( \sum_{w=1}^{W_k} b_{kw} \right)^{\frac{-1}{\gamma_k}} \frac{\gamma_k}{-1+\gamma_k} \lambda \right]^{-\gamma_k} - I_k \qquad \text{(Eq. 1)}$$

In Equation (Eq. 1) $b_{kw}$ is the base demand for the item at physical location k during remaining week w, where all remaining weeks are numbered from 1 through $W_k$; $\gamma_k$ is the price elasticity of the item selling at physical location k; $I_k$ is the current item quantity of the item in inventory at physical location k; and $\lambda$ is the scalar constant. In method 200, the location inventory record acts as a proxy for physical location k, such that the method is performed over the set of location inventory records associated with the set of physical locations k.

Equation (Eq. 1) is arrived at as follows. The price elasticities $\gamma_k$ given above as input are constant price elasticities. To produce the most revenue from a constant elasticity $\gamma$ with inventory I, remaining number of weeks W, and base demands $b_w$, the price should be set to a constant p*, given by Equation (Eq. 2), as follows:

$$p^*(I) = \left( \sum_{w=1}^{W} b_w \right)^{\frac{1}{\gamma}} I^{-\frac{1}{\gamma}} \qquad \text{(Eq. 2)}$$

This equation also assumes the item is intended to sell out completely in the remaining weeks. Thus, for physical location k, the price should be set to the constant $p_k^*$, given by Equation (Eq. 3), as follows:

$$p_k^*(I_k) = \left( \sum_{w=1}^{W_k} b_{kw} \right)^{\frac{1}{\gamma_k}} (I_k)^{\frac{1}{\gamma_k}} \qquad \text{(Eq. 3)}$$

The associated maximum revenue $R_k^*$ is given by multiplying Equation (Eq. 3) above by current item quantity $I_k$ of the item in inventory at physical location k, since each item in the current item quantity $I_k$ sells for the above price and all of $I_k$ is intended to be sold within the remaining weeks. This is shown by Equation (Eq. 4), as follows:

$$R_k^*(I_k) = \left( \sum_{w=1}^{W_k} b_{kw} \right)^{\frac{1}{\gamma_k}} (I_k)^{-\frac{1}{\gamma_k}+1} \qquad \text{(Eq. 4)}$$

Equations (Eq. 3) and (Eq. 4) assumes that the current item quantity $I_k$ for each location k is fixed and given. But, the current item quantity $I_k$ is to be varied in order to obtain more revenue. In one embodiment, varying the current item quantity $I_k$ means taking the item from one physical location and putting it in another. Thus, for each physical location k, the current item quantity $I_k$ in inventory may be varied by a quantity change $c_k$ to improve the total revenue across all physical locations. This quantity change $c_k$ can be positive or negative, as a either an increase or decrease in current item quantity $I_k$ at a physical location k may improve the total revenue across all stores. The expression for revenue with varying of the current item quantity is given by Expression (Eq. 5), as follows:

$$\max_{c_k} \sum_k \left(\sum_{w=1}^{W_k} b_{kw}\right)^{\frac{1}{\gamma_k}} (I_k + c_k)^{-\frac{1}{\gamma_k}+1} \quad \text{(Eq. 5)}$$

However, because the total inventory of an item is constant across all physical locations, additional quantities of the item cannot be added, and surplus quantities of the item cannot simply disappear. Thus, Expression (Eq. 5) is subject to the constraint given by Equation (Eq. 6), as follows:

$$\sum_k c_k = 0 \quad \text{(Eq. 6)}$$

Equation (Eq. 6) may be referred to as the inventory distribution constraint. Applying the inventory distribution constraint Equation (Eq. 6) to Expression (Eq. 5) means finds values for quantity change $c_k$ that maximize revenue while the sum of all quantity change $c_k$ values across all physical locations k is 0, meaning the quantity changes cancel each other out. That is, if the quantity change $c_k$ is negative for one store, meaning "reduce its inventory of the item," then those quantity change $c_k$ units have to be shipped to some other stores as positive $c_k$.

The expression for revenue, Expression (Eq. 5), is a function of the quantity change $c_k$, and the left-hand side of the inventory distribution constraint given by Equation (Eq. 6) is also a function of the quantity change $c_k$. Optimization theory indicates that at the optimal quantity change, the gradients of these two functions must be scalar multiples of each other. This implies that for all physical locations k, the quantity changes $c_k$ are all expressible in terms of a single unknown scalar constant λ, as shown by Equation (Eq. 1), as follows:

$$c_k = \left(\left(\sum_{w=1}^{W_k} b_{kw}\right)^{\frac{-1}{\gamma_k}} \frac{\gamma_k}{-1+\gamma_k} \lambda\right)^{-\gamma_k} - I_k \quad \text{(Eq. 1)}$$

Equation (Eq. 1) can be used to find the values of the quantity changes $c_k$ for all physical locations k once the value of scalar constant λ has been identified. To identify the value of scalar constant λ, substitute the right side of Equation (Eq. 1) for the quantity changes $c_k$ in the inventory distribution constraint equation Equation (Eq. 6) to arrive at a single equation in a single unknown, as shown by Equation (Eq. 7), as follows:

$$\sum_k \left(\left(\sum_{w=1}^{W_k} b_{kw}\right)^{\frac{-1}{\gamma_k}} \frac{\gamma_k}{-1+\gamma_k} \lambda\right)^{-\gamma_k} - I_k = 0 \quad \text{(Eq. 7)}$$

After constructing Equation (Eq. 7) above, solve Equation (Eq. 7) for to find the value of scalar constant λ. In one embodiment, the processor may perform this solution, for example by providing the equation and known variables to a suitable root finder application. Examples of suitable root finder applications are included with the Java® programming language.

In one embodiment, the processor retrieves all the known variable values of Equation (Eq. 7) from memory, including physical locations k, the total number of remaining weeks $W_k$, base demand for the item $b_{kw}$ at each physical location k during each remaining week w, price elasticity of the item $\gamma_k$ selling at each physical location k, and current item quantity (or inventory) $I_k$ at each physical location k. The processor may then execute the root finder application on these inputs to find the value of scalar constant λ. In one embodiment, there will be exactly one scalar constant λ that is the root of the above equation, because of the assumption that all $\gamma_k \geq 1$. The root finder will return this scalar constant λ, and the processor will store this scalar constant λ in memory.

Once the value of scalar constant λ has been found and stored in memory, the value of scalar constant λ can be used to find the values of the $c_k$ by substituting the value of scalar constant λ into Equation (Eq. 1). In one embodiment, the processor may perform this calculation. The values of quantity change $c_k$ which are produced by this process may be labeled as $c_k^*$. Generally herein, the application of a star (*) to a variable denotes a selected value of the variable over a range of possible values of the variable, wherein the selected value is the best or most suitable value for the purpose of the calculation available at the step when the selected value is identified. Thus, here the quantity changes $c_k^*$ give the most suitable changes in inventory for each store k.

In one embodiment, the processor retrieves all the known variable values of Equation (Eq. 1) from memory, including physical locations k, the total number of remaining weeks $W_k$, base demand for the item $b_{kw}$ at each physical location k during each remaining week w, price elasticity of the item $\gamma_k$ selling at each physical location k, current item quantity (or inventory) $I_k$ at each physical location k, and the scalar constant λ. For each physical location k, the processor then calculates the value of quantity change $c_k^*$, and stores it in memory in a location inventory record associated with the physical location k The formulations expressed in Equations (Eq. 1) and (Eq. 7) are not standard formulations, and were created specifically to resolve the technical problem of accurately identifying the quantity change from the current item quantity to an optimum item quantity at each physical location in a set of physical locations.

The set of surplus physical locations S is the set composed of those physical locations k where $c_k > 0$, and the set of deficit physical locations D is the set composed of those physical locations k where $c_k < 0$. In one embodiment, it is desirable to ship inventory from physical locations in the set of surplus physical locations S to physical locations in the set of deficit physical locations D at minimum cost.

In some embodiments, the outputs of process block 210 are: (i) quantity changes $c_k^*$ from current item quantity $I_k$ to an optimum item quantity for each physical location k; and (ii) the classification of the physical locations into a set of surplus physical locations S and a set of deficit physical locations D.

These outputs may be stored as a data structure in memory, or in storage, such as in retailer database 125. In some embodiments, the quantity changes $c_k^*$ and classifications for each physical location k are added to the location inventory record associated with the physical location k. Processing at process block 210 then completes, and processing continues at process block 215.

Figure 3:
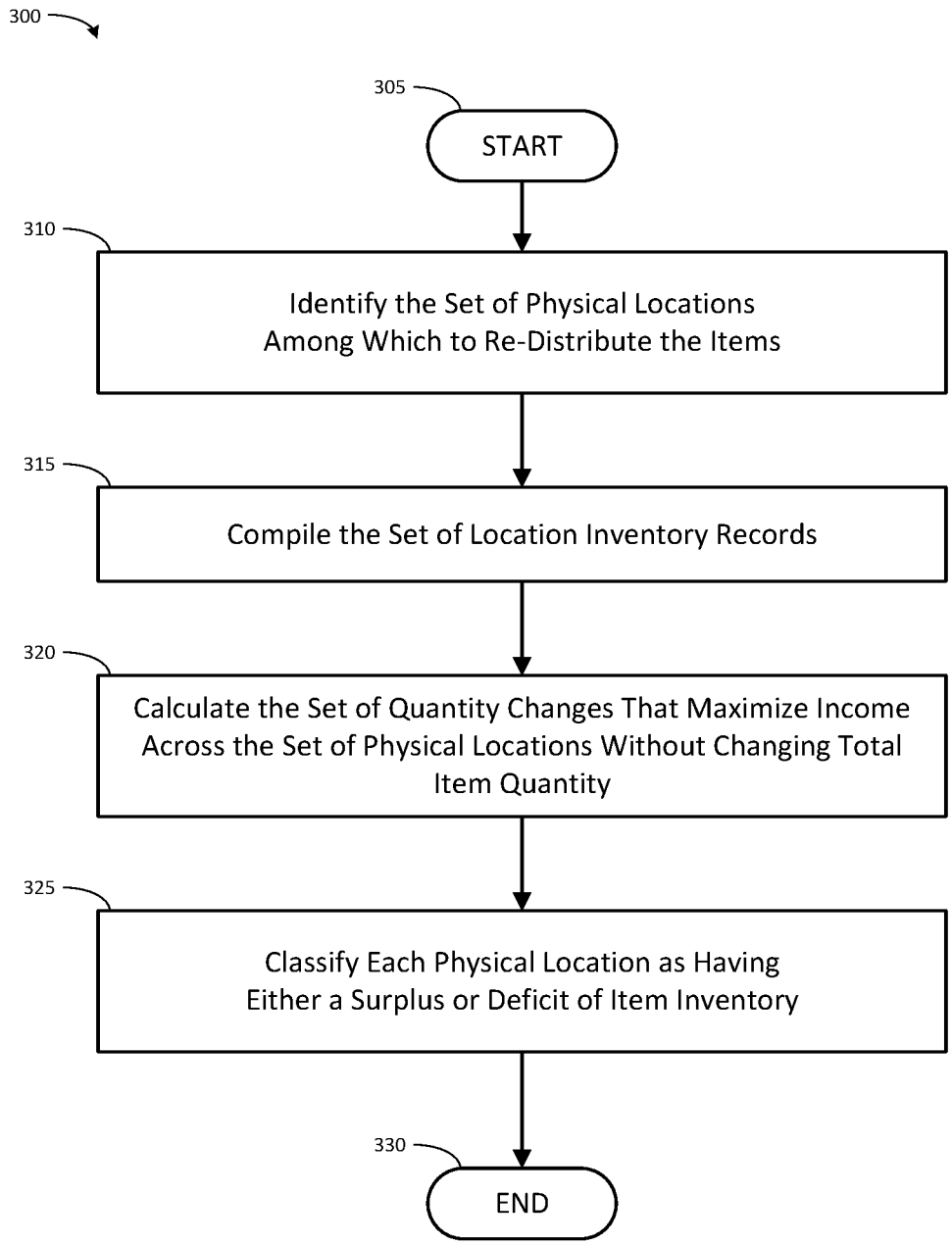
FIG. 3 illustrates further details of one embodiment of a method associated with maximizing revenue from re-selling returned items having a fixed life time.

Referring now to FIG. 3, FIG. 3 shows one embodiment of process block 210 in further detail as a computer-implemented method 300 associated with, for each location inventory record of the set of location inventory records, calculating a quantity change that will bring a current item quantity to an optimum item quantity for the location inventory record.

The method 300 initiates at start block 305 with the initiation of process block 210 and processing continues to process block 310. In one embodiment, the set of location inventory records is the set of location inventory records associated with the set of physical locations among which to redistribute the items. At process block 310, a processor identifies the set of physical locations among which to redistribute the items by, for example, (i) retrieving the set of physical locations among which to redistribute the items from memory, or from storage in retailer database 125, such as from the participant locations table; and (ii) parsing the set of physical locations to uniquely identify the set of physical locations. The processor stores the unique identifiers for the physical locations in storage or memory. Process block 310 then completes and processing continues at process block 315.

At process block 315, the processor compiles the set of location inventory records. In one embodiment, the processor retrieves a location inventory record that is associated with each physical location of the set of physical locations from memory or from storage in retailer database 125. In one embodiment, this may be accomplished by retrieving from storage or memory the unique identifiers identified in process block 310, and retrieving from memory or storage in retailer database 125 each location inventory record which matches a unique identifier. The processor compiles the retrieved location inventory records into the set of location inventory records, and the set of location inventory records is stored in storage or memory. Process block 315 then completes and processing continues at process block 320.

At process block 320, for each location inventory record of the set of location inventory records, the processor determines the quantity change that maximizes revenue from sales of the item across the set of physical locations without altering a total quantity of the item across the set of location inventory records. In one embodiment, for each location inventory record of the set of location inventory records, the processor retrieves the current item quantity $I_k$ from the location inventory record associated with physical location k. The processor then determines the quantity change $c_k^*$, for example by calculating the value of the quantity change $c_k^*$ as described above with reference to Equation (Eq. 1), above. The processor associates the quantity change for the location inventory record with that location inventory record in storage or memory, for example by adding the quantity change to the location inventory record. Process block 320 then completes and processing continues at process block 325.

At process block 325, the processor classifies each physical location as having either a surplus or deficit of item inventory. For each location inventory record of the set of location inventory records, the processor retrieves the quantity change $c_k^*$ from the location inventory record associated with physical location k, and determines if the quantity change $c_k^*$ is positive or negative. The processor then classifies the physical location k associated with location inventory record as belonging (i) to a set of inventory surplus locations if the quantity change is negative, or (ii) to a set of inventory deficit locations if the quantity change is positive. In one embodiment, the processor then associates the classification for the physical location k with the record of the physical location in memory or storage in retailer database 125, such as by writing the classification to the participant locations table. In another embodiment, the processor then associates the classification with the location inventory record associated with physical location k, for example by adding the classification to the location inventory record. In one embodiment, (i) each source physical location of a minimum-cost shipment always belongs to the set of inventory surplus locations and (ii) each destination physical location of the minimum-cost shipment always belongs to the set of inventory deficit locations, ensuring that inventory imbalances are not increased. Process block 325 then completes and processing continues to end block 330, where processing in method 200 resumes.

Determine a Minimum-Cost Shipment

Shipping an item from one location to another uses shipping resources. For example, shipping vehicle capacity is occupied by the item. That capacity is occupied by the item during the time it takes to ship the item. The shipping causes the vehicle to consume fuel to ship the item, and to cause wear to the vehicle. In another example, the item may be handled by delivery personnel, vehicle drivers, freight handlers, or other persons. In a further example, shipping the item may require additional packaging materials such as boxes, packing filler, tape, and labels. In one embodiment, the use of these shipping resources is represented in the aggregate by a cost. Accordingly, the calculations herein refer to the use of these shipping resources as a cost.

But, that cost may not necessarily be a financial cost. Instead, the cost may be for example space occupied by an item, which is taken up either in storage space at physical locations or in shipping vehicle capacity in a transfer until the item is sold. The cost may also be, for example, an amount of energy consumed to maintain the item, such as for perishable goods, at a certain physical locations compared to the energy consumed to transfer the item. Similarly, revenue from sales of the item may not necessarily be a financial cost. For example, in the context of energy production, fuel may be consumed (a sale) to produce a certain amount of energy (income). This may be balanced against the energy consumed to move the fuel from its present location for consumption at another location. In each situation, the processes, rules, and formulae described herein allow the computer (i) to more accurately derive whether a better (for example, more efficient or more cost-effective) redistribution of items exists, and (ii) to identify that redistribution and how to bring it about. Thus, the processes described herein have a wide variety of applications.

Referring again to FIG. 2, at process block 215, the processor determines a cost of a minimum-cost shipment among the physical locations to effect the quantity change for all location inventory records of the set. In one embodiment, the processes of process block 215 may be performed by inventory redistribution control system 100, for example by a processor implementing transportation cost module 110. Consistent with the discussion above, the minimum-cost shipment is a minimum-resource shipment—a shipment that consumes or uses the fewest shipping resources in the aggregate. The minimum-cost shipment may also be referred to as a redistribution. In one embodiment, the minimum-cost shipment or redistribution describes sources and destinations for each transfer of the item, as well as the transfer quantities between each source and destination pair.

In one embodiment, the inputs at process block 215 are: (i) quantity changes $c_k^*$ from current item quantity $I_k$ to an optimum item quantity for each physical location k; and (ii) the classification of the physical locations into a set of surplus physical locations S and a set of deficit physical locations D; each of which was stored in memory or storage at the end of process block 210.

Shipping the inventory of the item from physical locations of the set of surplus physical locations S to physical locations of the set of deficit physical locations D at minimum cost is an application of the Transportation Problem. Commercially available solvers, such as Gurobi®, can be used to find the minimum-cost shipment. In some embodiments where speed may be important, the Gurobi® solver may be particularly useful because it has a fast solution time for the Transportation Problem, even when the number of physical locations is high (for example, hundreds, or even thousands of retail stores).

In one embodiment, the processor implements a solver to find the minimum-cost shipment. The processor provides the solver with a linear program formulation of the Transportation Problem including the quantity changes $c_k^*$ for each physical location k, the set of surplus physical locations S, and the set of deficit physical locations D. The solver operates to minimize a total cost of all the shipments C given by Equation (Eq. 8), as follows:

$$C = \sum_{s,d} q_{sd} c_{sd} \qquad \text{(Eq. 8)}$$

where $q_{sd} \geq 0$ is the base transfer quantity of the item to ship or transfer from physical location s belonging to the set of surplus physical locations S to physical location d belonging to the set of deficit physical locations D, and $c_{sd}$ is the cost per item to ship the item from surplus physical location s to deficit physical location d.

In some embodiments, the solver is also provided with the following transportation constraints on the base transfer quantities $q_{sd}$. First, the base transfer quantity out of a surplus physical location s should equal the surplus, represented by quantity change $c_s^*$. This first constraint is given by Equation (Eq. 9), as follows:

$$\sum_d q_{sd} = c_s^* \; \forall \; s \in S \qquad \text{(Eq. 9)}$$

Second, the base transfer quantity into a deficit physical location d should equal the deficit, represented by quantity change $-c_d^*$ (recall the quantity change reflecting the deficit is a negative number). This second constraint is given by Equation (Eq. 9), as follows:

$$\sum_s q_{sd} = -c_d^* \; \forall \; d \in D \qquad \text{(Eq. 10)}$$

In one embodiment, the outputs of the solver is the minimum-cost shipment, including (i) the set of base transfer quantities $q_{sd}$, which is the quantity of the item to ship (or otherwise transfer) from physical location s belonging to the set of surplus physical locations S to physical location d belonging to the set of deficit physical locations D, at minimum total cost, and (ii) the total cost C to perform the shipment of all base transfer quantities $q_{sd}$. Thus, the minimum-cost shipment information includes the item quantity to ship, the source physical location, the destination physical location, and the total cost of all such shipments. In one embodiment, this minimum-cost shipment describes a baseline redistribution among the physical locations to effect the quantity change for each location inventory record of the set at minimum cost.

The processor may store these outputs as a data structure in memory, or in storage, such as in retailer database 125. In some embodiments, outgoing base transfer quantities and destination(s) for physical location s are added to the location inventory record associated with the physical location s. In some embodiments, incoming base transfer quantities and source(s) for physical location d are added to the location inventory record associated with the physical location d. In some embodiments, the information about the minimum-cost shipment are stored elsewhere in memory or storage, such as in retailer database 125. For example, the processor may store the minimum-cost shipment as a data structure that indicates the total cost of the minimum-cost shipment, such as total shipping cost C, as well as for each individual inventory transfer of the minimum-cost shipment at least (i) a source physical location in the set of physical locations, such as surplus physical location s, (ii) a destination physical location in the set of physical locations, such as deficit physical location d, and (iii) a transfer quantity of the item between the source physical location and destination physical location, such as base transfer quantity $q_{sd}$. Processing at process block 215 then completes, and processing continues at process block 220.

Balancing Optimized Revenue Against Shipping Cost

If a retailer were to actually execute the shipments determined at process block 215, the actual dollar amount G which the retailer would receive is the revenue given by Equation (Eq. 4) for the sum of the current item quantity $I_k$ and the quantity change $c_k^*$ for each physical location k from process block 210 minus the total shipping cost C from process block 215, as shown by Equation (Eq. 11), as follows:

$$G = \sum_k R_k^* (I_k + c_k^*) - C \qquad \text{(Eq. 11)}$$

But, the revenue maximization in process block 210 was performed without any accounting for the transportation cost. Thus, the total shipment cost C of the minimum-cost shipment from process block 215 might be so high that G is negative. Where G is negative, the retailer will lose money by performing the redistribution of inventory, and it would be undesirable to recommend these shipments to the retailer.

Further, even if G is positive, G may nevertheless be larger if the total shipment cost C is reduced. Being less aggressive on maximizing revenue, with lower associated total shipping cost C, might be a better tradeoff and give an amount larger than G. In fact, G is never the highest dollar amount that the retailer could receive. The revenue maximization given by Equation (Eq. 11) above is always too aggressive.

It is an obstacle to having revenue maximization account for shipping cost that the cost of transportation is undeterminable until after the surpluses and deficits are determined. At the time the surpluses and deficits are calculated, no information about transportation cost is available. Thus, determining the surpluses and deficits has to be done without any information about transportation cost, leading to the overly-aggressive revenue maximization of G, above. One way to solve this difficult problem is to account for both the revenue and cost simultaneously by scaling the redistribution to only perform the amount of redistribution that maximizes total revenue after shipping costs. Thus, for performance to be better than G, a scaling factor should be identified that when applied to the quantity changes $c_k^*$ and the total shipping cost C maximizes the total revenue after shipping costs.

This improvement over G may not necessarily be the best possible solution for any choice of $c_k$. But it is better than just using $c_k^*$ directly as described by Equation (Eq. 11). While this application refers to maximization or optimization of revenue, maximization or optimization does not necessarily require that the greatest possible revenue be reached. In one embodiment such maximization of revenue refers to improvement in revenue performance over G.

At process block 220, the processor determines if a scaling factor can be found that, when applied to both the quantity changes and the cost of the minimum-cost shipment, maximizes the total revenue after an income over all physical locations is reduced by the cost scaled by the scaling factor. In one embodiment, the processes of process block 220 may be performed by inventory redistribution control system 100, for example by a processor implementing aggressiveness optimizer module 115.

In one embodiment, the inputs at process block 220 include: (i) quantity changes $c_k^*$ from current item quantity $I_k$ to an optimum item quantity for each physical location k stored in memory or storage at the end of process block 210; (ii) the total cost of the minimum-cost shipment C stored in memory or storage at the end of process block 215; (iii) the set of physical locations k and the current item quantity $I_k$, price elasticity $\gamma_k$, and base demand $b_{kw}$ values, retrievable from memory or storage, such as from retailer database 125.

Consider a scaling factor $\alpha$ between zero and one, inclusive ($\alpha \in [0,1]$), applied as multiplier to all the quantity changes $c_k^*$. This scaling factor represents the aggressiveness of revenue maximization. With aggressiveness, the total revenue over all stores is given by Equation (Eq. 12), as follows:

$$\sum_k R_k^*(I_k + \alpha c_k^*) = \sum_k \left(\sum_{w=1}^{W_k} b_{kw}\right)^{\frac{1}{\gamma_k}} (I_k + \alpha c_k^*)^{-\frac{1}{\gamma_k}+1} \quad (Eq.\ 12)$$

For a scaling factor of one ($\alpha=1$), that is, maximum aggressiveness, this revenue is the maximized revenue obtained at process block 210. For a scaling factor of zero ($\alpha=0$), that is, minimum aggressiveness, this revenue is the revenue obtained if no inventory redistribution was performed at all. By setting the scaling factor $\alpha$ between these two extremes, total revenue can be obtained in between not doing any inventory re-redistribution and the best possible redistribution.

Note that the inventory distribution constraint given by Equation (Eq. 6) is always met for any value of the scaling factor $\alpha$ since the constraint is just multiplied through by the scaling factor $\alpha$, as shown by Equation (Eq. 13), as follows:

$$\sum_k \alpha c_k^* = 0 \quad (Eq.\ 13)$$

Thus, any value of the scaling factor $\alpha$ gives a legitimate inventory redistribution.

The cost of the transportation solution for all the quantity changes scaled by the scaling factor $\alpha c_k^*$ is the total shipment cost C multiplied by the scaling factor $\alpha$, or simply $\alpha C$. This is so because shipping $\alpha c_k^*$ is the same as shipping $c_k^*$, except reduced by the scaling factor $\alpha$.

Similarly, the base quantities of the item to ship (or otherwise transfer) $q_{sd}$ from physical location s to physical location d are also multiplied by the scaling factor $\alpha$, or simply $\alpha q_{sd}$. The transportation constraints given by given by Equations (Eq. 9) and (Eq. 10) remain satisfied when adjusted for aggressiveness, because each constraint is just multiplied through by the scaling factor $\alpha$, as shown by Equations (Eq. 14) and (Eq. 15), as follows:

$$\sum_d \alpha q_{sd} = \alpha c_s^* \forall s \in S \quad (Eq.\ 14)$$

$$\sum_s \alpha q_{sd} = -\alpha c_d^* \forall d \in D \quad (Eq.\ 15)$$

Thus, for any scaling factor $\alpha$, the revenue minus cost after performing the associated redistribution specified applying the scaling factor to the quantity changes $\alpha c_k^*$ is given by Equation (Eq. 16), as follows:

$$G(\alpha) = \sum_k R_k^*(I_k + \alpha c_k^*) - \alpha C \quad (Eq.\ 16)$$

$$= \left[\sum_k \left(\sum_{w=1}^{W_k} b_{kw}\right)^{\frac{1}{\gamma_k}} (I_k + \alpha c_k^*)^{-\frac{1}{\gamma_k}+1}\right] - \alpha C$$

Equation (Eq. 16) provides a single formula that trades off revenue against transportation cost while adjusting aggressiveness.

The derivative of the function given by Equation (Eq. 16) can be used to find the scaling factor $\alpha$ that maximizes $G(\alpha)$, the total revenue after shipping costs. The derivative of $G(\alpha)$ is given by Equation (Eq. 17), as follows:

$$G'(\alpha) = \left[\sum_k \left(\sum_{w=1}^{W_k} b_{kw}\right)^{\frac{1}{\gamma_k}} \left(-\frac{1}{\gamma_k}+1\right)(I_k + \alpha c_k^*)^{-\frac{1}{\gamma_k}} c_k^*\right] - C \quad (Eq.\ 17)$$

In Equation (Eq. 17), the scaling factor $\alpha$ that maximizes the total revenue after shipping costs $G(\alpha)$ occurs where $G'(\alpha)=0$, which is given by Equation (Eq. 18), as follows:

$$\left[\sum_k \left(\sum_{w=1}^{W_k} b_{kw}\right)^{\frac{1}{\gamma_k}} \left(-\frac{1}{\gamma_k}+1\right)(I_k + \alpha c_k^*)^{-\frac{1}{\gamma_k}} c_k^*\right] - C = 0 \quad (Eq.\ 18)$$

Equation (Eq. 18) is a single equation in a single unknown: the scaling factor $\alpha$. Solving Equation (Eq. 18) for the scaling factor $\alpha$ yields the scaling factor that maximizes the total revenue after shipping costs $G(\alpha)$.

Figure 4:
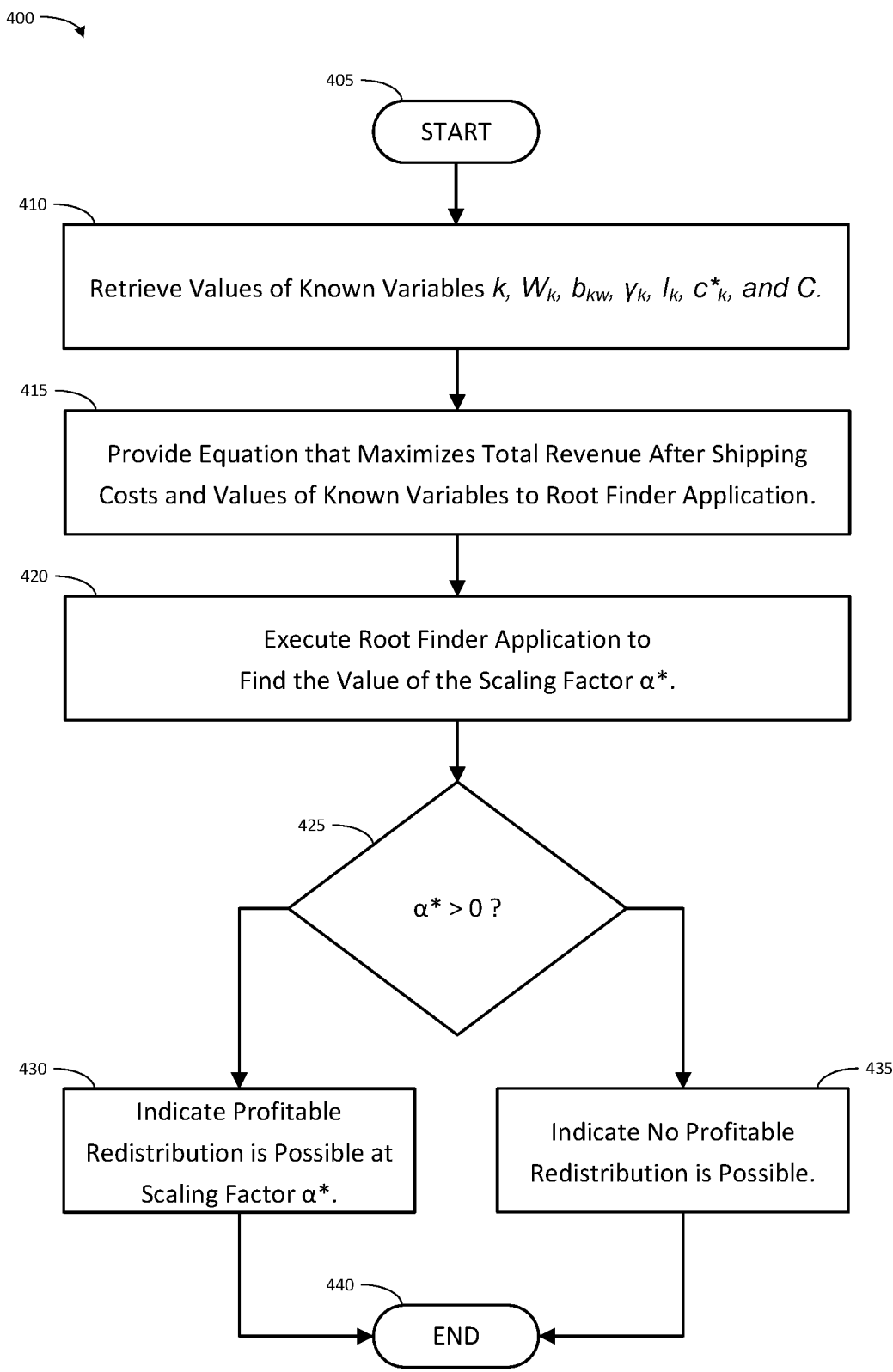
FIG. 4 illustrates one embodiment of a method associated with determining if an aggressiveness scaling factor can be found that maximizes the total revenue after shipping costs, in the context of maximizing revenue from re-selling returned items having a fixed life time.

In one embodiment, the processor may perform this solution. Referring now to FIG. 4, FIG. 4 shows one embodiment of process block 220 in further detail as a computer-implemented method 400 associated with determining if an aggressiveness scaling factor α can be found that maximizes the total revenue after shipping costs G(α). More formally, in one embodiment, the method 400 operates to determine if the scaling factor α can be found that, when applied to both (i) the quantity changes needed to reach the optimum item quantity for all the location inventory records in the set of location inventory records and (ii) the cost of the minimum-cost shipment, maximizes the total revenue after income over all physical locations is reduced by the cost of the minimum-cost shipment multiplied (or scaled) by the scaling factor α. In another embodiment, the method 400 operates to determine if a set of possible scaling factors includes one scaling factor α that satisfies the following threshold condition: maximizing a total revenue received from sales of the item G(α) when the quantity changes for each location inventory record $c_k^*$ are combined with the one scaling factor α after deducting the cost C combined with the one scaling factor α. The term 'combined' refers at least to multiplication operations as shown herein, but more generally may also refer to division, addition, subtraction, and/or other modifying operations involving the scaling factor. Method 400 may be performed by a processor accessing memory to perform the steps described herein, including (i) retrieving any necessary information, (ii) calculating, determining, generating, classifying, or otherwise creating any data, and (iii) storing any data calculated, determined, generated, classified, or otherwise created. In one embodiment, method 400 may be performed by the processor's implementation of aggressiveness optimizer module 115.

The method 400 initiates at start block 405 with the initiation of process block 220 and processing continues to process block 410. At process block 410, the processor retrieves all the known variable values of Equation (Eq. 18) from memory, including physical locations k, the total number of remaining weeks $W_k$, base demand for the item $b_{kw}$ at each physical location k during each remaining week w, price elasticity of the item $\gamma_k$ selling at each physical location k, current item quantity (or inventory) $I_k$ at each physical location k, the quantity change $c_k^*$ to reach optimum inventory quantity for each physical location k, and the total shipment cost C. Processing at process block 410 then completes and processing continues at process block 415.

At process block 415, the processor provides Equation (Eq. 18) and the known variables to an appropriate root finder application, such as those discussed above with reference to process block 210. Further, the processor may provide a range in which to find a root to the root finder. The range is the set of possible scaling factors which may or may not include one scaling factor that satisfies the threshold condition identified above. Here, the processor provides the range from zero to one, inclusive ([0,1]), for the scaling factor α to the root finder. Processing at process block 415 then completes and processing continues at process block 420.

At process block 420, the processor executes the root finder application on these inputs to find the value of the scaling factor α. If the root finder can find the value of the scaling factor α, the root finder will return the value, which may be referred to as α*. If the value was found, the value of the scaling factor α* will be stored in memory. If the value was not found, the value of the scaling factor α* will be undefined, perhaps by being given a NULL value in memory. Processing at process block 420 then completes and processing continues at decision block 425.

At decision block 425, the processor determines whether value of the scaling factor α* is greater than 0.

The following cases, (i) where the root is not found between 0 and 1, inclusive, (ii) where the root is zero, and (iii) where the root is greater than zero are the only cases which may occur.

Case (i): The root finder may determine that there is no root between zero and one, inclusive ([0,1]), for Equation (Eq. 18) for the provided known variables. This may occur if G'(α) is always negative, meaning total revenue after shipping costs G(α) is decreasing throughout the range zero to one, inclusive ([0,1]). Where G'(α) is always negative, no profitable redistribution is possible. The total shipping cost C is large enough that G'(0) is negative. Since G'(0) is negative, G' will stay negative and thus G' has no root. Here, the best-case scenario is performing no redistribution, because total revenue after shipping costs G(α) is highest when scaling factor α=0. In this case, no profitable distribution is possible due to shipping costs being too high.

Case (ii): The root finder may determine that the root α*=0. Where the scaling factor α* is zero, again, no profitable redistribution is possible. Here, G'(0)=0, meaning C is large enough that G'(0) is 0. As before, no profitable distribution is possible due to shipping costs being too high.

Case (iii): The root finder may determine that the root α*>0. Where the scaling factor α* is greater than zero, a profitable redistribution is possible. In this case, α*$c_k^*$ is the most profitable redistribution, and the total revenue after shipping costs is G(α*).

As a practical matter, the important distinction is whether a profitable redistribution is possible or not, so decision block 425 tests for case (iii), whether or not the scaling factor α* is greater than zero (α*>0). If the scaling factor α* is greater than zero, processing at decision block 425 completes, and processing continues at process block 430. If the scaling factor α* is not greater than zero, such as by being less than or equal to zero or by being undefined, processing at decision block 425 completes, and processing continues at process block 435.

At process block 430, the processor indicates that a profitable redistribution is possible at scaling factor α*, following a case (iii) outcome described above. Thus, the processor may provide an indication that the scaling factor α* maximizes total revenue by transmitting or storing the indication in memory. Also, the processor may provide the scaling factor α* by transmitting the scaling factor α or storing it in memory. Processing at process block 430 then completes, and processing continues to END block 440, where processing in method 200 resumes.

Alternatively, at process block 435, the processor indicates that a profitable redistribution is not possible, following a case (i) or case (ii) outcome described above. Thus, the processor may provide an indication that there is no profitable redistribution by transmitting or storing the indication in memory or storage. For informational purposes, the basis of this determination can also be provided: in a case (i) outcome, the processor may further provide an indication by transmission or storage that the scaling factor α* cannot be found, or in a case (ii) outcome, the processor may further provide an indication by transmission or storage that the scaling factor α* is equal to 0. Processing at process block 435 then completes, and processing continues to END block 440, where processing in method 200 resumes.

Additional Discussion of Balancing Revenue and Shipping Cost

Note, the scaling factor α (the aggressiveness) need not exceed one. If α>1, then because $c_k^*$ gives the maximum possible revenue (as discussed with regard to process block 210), the revenue received after a redistribution scaled by the scaling factor $\alpha$ is less than or equal to the revenue received for completing the full redistribution, as shown by Equation (Eq. 19), as follows:

$$\sum_k R_k^*(I_k + \alpha c_k^*) \le \sum_k R_k^*(I_k + c_k^*) \qquad \text{(Eq. 19)}$$

At the same time, where $\alpha>1$, the total shipping cost scaled by the scaling factor $\alpha C$ is greater than the total shipping cost C without the scaling. Thus, $G(\alpha)<G(1)$, and so the total revenue after shipping costs $G(\alpha)$ can't be the best possible case. Thus, it is not necessary to consider any scaling factor $\alpha$ that is greater than one ($\alpha>1$).

Note also that the optimum scaling factor $\alpha^*$ can never be 1. Applying $\alpha=1$ in Equation (Eq. 17) above for $G'(\alpha)$, the portion in the square brackets will be 0, because it is the derivative of total revenue, which is maximum when $\alpha=1$. Thus $G'(1)=-C$, and so the maximum of $G'(\alpha)$ cannot be at $\alpha=1$. As the optimum scaling factor $\alpha^*$ cannot ever be 1, the performance of just process blocks 210 and 215, resulting in G, will never yield an optimal redistribution. Thus, in one embodiment, an optimized redistribution represents, at a minimum, an improvement over the performance of G.

Note further that $G'(\alpha)$ has at most one root in [0,1]. The second derivative of the function for the total revenue after shipping costs $G(\alpha)$ is given by Equation (Eq. 20), as follows:

$$G''(\alpha) = \left[ \sum_k \left( \sum_{w=1}^{W_k} b_{kw} \right)^{\frac{1}{\gamma_k}} - \frac{1}{\gamma_k} \left( -\frac{1}{\gamma_k} + 1 \right) (I_k + \alpha c_k^*)^{-\frac{1}{\gamma_k}-1} (c_k^*)^2 \right] \qquad \text{(Eq. 20)}$$

As discussed above, price elasticity $\gamma_k$ is assumed to be greater than 1. Because price elasticity $\gamma_k$ is greater than 1, Expression (Eq. 21), as follows:

$$-\frac{1}{\gamma_k}\left(-\frac{1}{\gamma_k} + 1\right) \qquad \text{(Eq. 21)}$$

is negative, and Expression (Eq. 22), as follows:

$$(I_k + \alpha c_k^*)^{-\frac{1}{\gamma_k}-1}(c_k^*)^2 \qquad \text{(Eq. 22)}$$

is positive. Thus, each term in the summation over all physical locations k is negative and thus Equation (Eq. 20), $G''(\alpha)$ is always negative. While $c_k^*$ can be either positive or negative, the factor $(c_k^*)^2$ forces the outcome of Expression (Eq. 22) to remain positive.

If $G'(0) \le 0$, then $G'(\alpha)$ is negative for $\alpha>0$ and so $G'(\alpha)$ has at most one root, namely at 0. Moreover, $G(\alpha)$ is maximum at 0. As discussed above, where $\alpha^*=0$ no profitable redistribution is possible. If $G'(0)>0$, then $G'(\alpha)$ has exactly one root, and it is larger than 0 and less than 1. As discussed above, where $\alpha^*$ is greater than zero and less than 1, profitable redistribution is possible. Therefore $G'(\alpha)$ has at most one root in [0,1].

Generating Transfer Instructions

At process block 225, if the scaling factor is found, the processor generates transfer instructions for an optimum redistribution of the item based on the application of the scaling factor to the minimum-cost shipment. In one embodiment, the processes of process block 225 may be performed by inventory redistribution control system 100, for example by a processor implementing instruction generator module 120. In one embodiment, the processor generates the optimum redistribution to ship a portion scaled by the scaling factor of the transfer quantity between the source physical location and destination physical location for each individual inventory transfer.

For purposes of this description, transfer instructions are the set of all instructions to carry out the redistribution of the inventory of an item among all physical locations, and instructions to individual physical locations describing the portions of the transfer instructions relevant to the individual physical location may be referred to as portions (or subsets) of those transfer instructions. The portion of the transfer instructions that pertain to an individual transfer to or from the individual physical location may be referred to as a transfer instruction (in the singular, and potentially belonging to a larger set of transfer instructions). Reference to portion, subset, and transfer instruction is a terminology of convenience only, and does not prevent a portion of the instructions provided to a computing device associated with a physical location from including additional information beyond that which is immediately relevant to the physical location. In one embodiment, the processor provides at least a portion of the transfer instructions, or an individual transfer instruction, associated with an inventory transfer from a selected source physical location to at least one of: (i) a computing device associated with the selected source physical location; (ii) a computing device associated with the selected destination physical location; and (iii) a computing device associated with a retailer of the item.

In one embodiment, the processor provides at least a portion of the transfer instructions associated with an inventory transfer from a selected source physical location to a computing device associated with the selected source physical location.

In one embodiment, the processor provides at least a portion of the transfer instructions associated with an inventory transfer to a selected destination physical location to a computing device associated with the selected destination physical location.

In one embodiment, the processor provides the transfer instructions to a computing device associated with a retailer of the item. The retailer can then provide appropriate portions of the transfer instructions to computing devices associated with the selected source and destination physical locations. This may be in a push or pull arrangement—the computing device associated with the retailer may transmit the appropriate portion of the transfer instructions to a computing device associated with a physical location (i) without first receiving a request, or (ii) in response to a request received from the computing device associated with a physical location.

In one embodiment, a transfer instruction includes at least one of a source physical location and a destination physical location, each belonging to the set of physical locations. In one embodiment, the transfer instruction includes an actual transfer quantity of an item.

Figure 5:
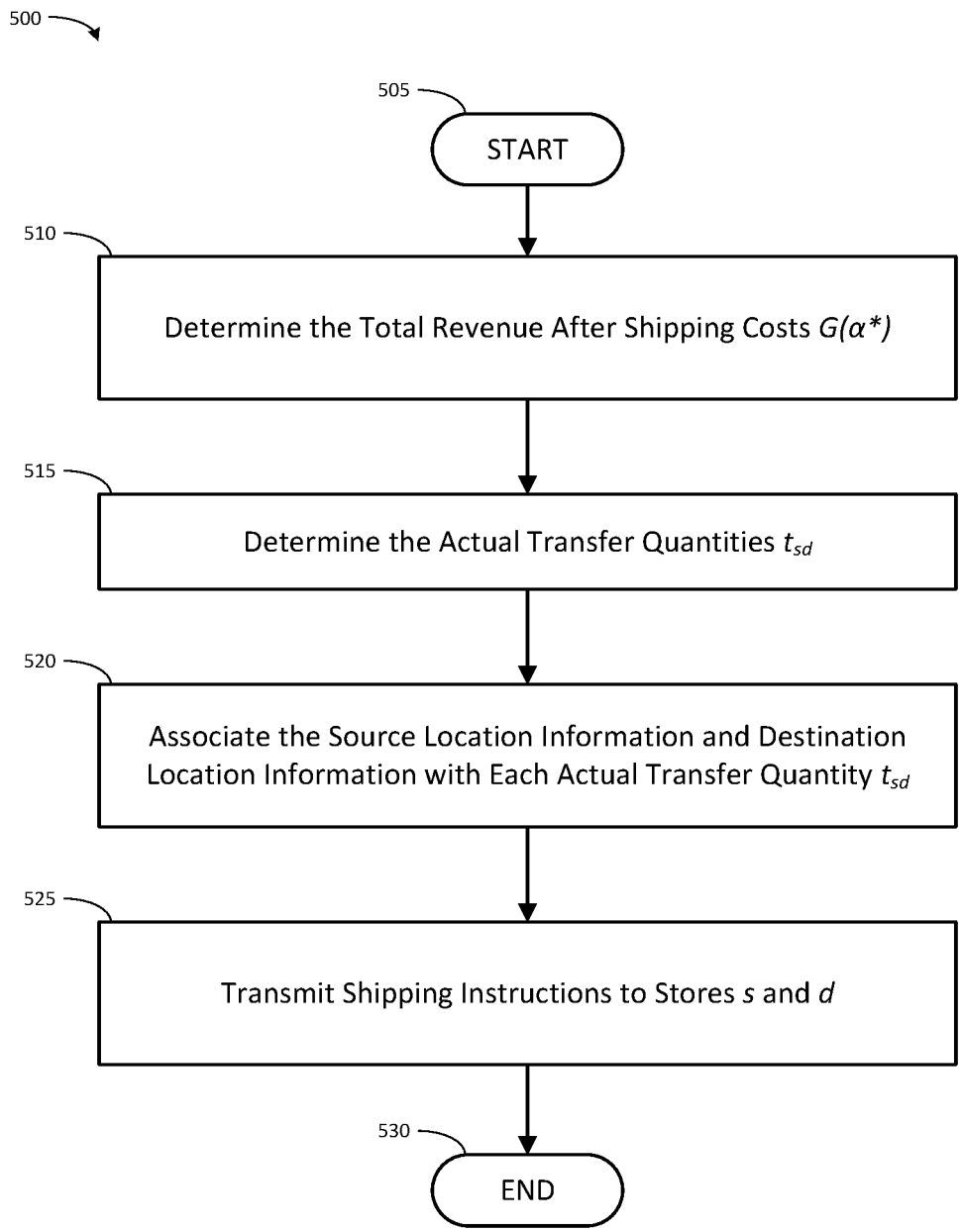
FIG. 5 illustrates one embodiment of a method associated with generating transfer instructions for an optimum redistribution of an item, in the context of maximizing revenue from re-selling returned items having a fixed life time.

Referring now to FIG. 5, FIG. 5 shows one embodiment of process block 225 in further detail as a computer-implemented method 500 associated with generating transfer instructions for an optimum redistribution of an item. More formally, in one embodiment, the method 500 operates to generate transfer instructions for an optimum re-distribution of the item based on the application of the scaling factor to the minimum-cost shipment. In another embodiment, the method 500 operates to generate an electronic output including a set of transfer instructions to perform the redistribution of the item with transfer quantities of the item to be transferred between the physical locations scaled by the one scaling factor. Method 500 may be performed by a processor accessing memory to perform the steps described herein, including (i) retrieving any necessary information, (ii) calculating, determining, generating, classifying, or otherwise creating any data, and (iii) storing any data calculated, determined, generated, classified, or otherwise created. In one embodiment, the processes method 500 may be performed by inventory redistribution control system 100, for example by a processor implementing instruction generator module 120.

The method 500 initiates at start block 505 with the initiation of process block 225 and processing continues to process block 510. At process block 510, the processor determines the total revenue after shipping costs $G(\alpha^*)$. In one embodiment, total revenue after shipping costs $G(\alpha^*)$ may be determined by solving Equation (Eq. 16) with the known values of the for the scaling factor $\alpha^*$, the physical locations k, the total number of remaining weeks $W_k$, base demand for the item $b_{kw}$ at each physical location k during each remaining week w, price elasticity of the item $\gamma_k$ selling at each physical location k, current item quantity (or inventory) $I_k$ at each physical location k, the quantity change $c_k^*$ to reach optimum inventory quantity for each physical location k, and the total shipment cost C. The processor retrieves each of these values from memory or storage. The processor then solves Equation (Eq. 16) for these values to determine the total revenue after shipping costs $G(\alpha^*)$. The processor then provides an indication of the resulting calculated total revenue after shipping costs $G(\alpha^*)$ by transmitting or storing the indication in memory or storage. This may be helpful for the retailer in determining whether the profitable redistribution should be performed. (For example, performing the profitable redistribution may only be minimally more profitable than not performing the redistribution, and the retailer may then choose not to perform the redistribution.)

In one alternative embodiment, the determination of total revenue after shipping costs $G(\alpha^*)$ may be performed by the processor's implementation of aggressiveness optimizer module 115 as part of method 400. For example, the determination may occur at or immediately following process block 430, as described with reference to FIG. 4 above.

Processing at process block 510 completes, and the processor proceeds to determine the scaled redistribution $\alpha^* c_k^*$. Processing continues at process block 515. At process block 515 the processor determines the actual transfer quantities $t_{sd}$. The actual transfer quantity $t_{sd}$ is a base transfer quantity of the item to ship or transfer $q_{sd}$ between the physical locations (according to the minimum-cost shipment or redistribution) scaled by the scaling factor. The processor retrieves from memory or storage the base transfer quantities of the item to ship $q_{sd}$, for each transfer from source physical location s and destination physical location d. The processor then multiplies each quantity of the item to ship by the scaling factor $\alpha^*$.

As a practical matter, this may result in non-integer item quantities. In one embodiment, the processor therefore applies a rounding rule to reach integer quantities of items for a transfer. The rounding rule can be any of always round up to the next higher integer, always round down to the next lower integer, or always round to the nearest integer, as long as the chosen rounding rule is applied universally across all quantity transfers. This operation of rounding a quantity combined with the scaling factor to a whole number may be referred to as 'scaling' the quantity by the scaling factor. Several example forms of scaling operations follow.

In one embodiment, the processor generates, for each transfer from source physical location s and destination physical location d, an actual transfer quantity $t_{sd}$, given by Equation (Eq. 23), as follows:

$$t_{sd}[\alpha^* q_{sd}] \quad \text{(Eq. 23)}$$

where the actual transfer quantity $t_{sd}$ is the product of scaling factor $\alpha^*$ and the base transfer quantity of the item to ship $q_{sd}$ rounded to the nearest integer.

In one embodiment, the processor generates, for each transfer from source physical location s and destination physical location d, an actual transfer quantity $t_{sd}$, given by Equation (Eq. 24), as follows:

$$t_{sd}=[\alpha^* q_{sd}] \quad \text{(Eq. 24)}$$

where the actual transfer quantity $t_{sd}$ is the product of scaling factor $\alpha^*$ and the base transfer quantity of the item to ship $q_{sd}$ rounded up to the next higher integer.

In one embodiment, the processor generates, for each transfer from source physical location s and destination physical location d, an actual transfer quantity $t_{sd}$, given by Equation (Eq. 25), as follows:

$$t_{sd}=[\alpha^* q_{sd}] \quad \text{(Eq. 25)}$$

where the actual transfer quantity $t_{sd}$ is the product of scaling factor $\alpha^*$ and the base transfer quantity of the item to ship $q_{sd}$ rounded up to the next lower integer.

The processor stores each actual transfer quantity $t_{sd}$ in a data structure in memory or storage. Processing at process block 515 completes and processing continues at process block 520.

At process block 520, the processor associates location information for each source physical location s and destination physical location d with the actual transfer quantity $t_{sd}$. The processor retrieves from memory or storage each actual transfer quantity $t_{sd}$ and location information for source physical location s and destination physical location d. The processor associates the location information for physical locations s and d with the with the actual transfer quantity $t_{sd}$ in a data structure in memory or storage. Processing at process block 520 completes, and processing continues at process block 525.

At process block 525, the processor accesses memory to transmit the transfer instructions over a network. In one embodiment, the processor transmit each transfer instruction over a network to a computing device associated with a physical location indicated in the transfer instruction to cause the redistribution of the item with the transfer quantities scaled by the one scaling factor (as discussed above) based on the transfer instructions. In one embodiment, the processor sends the transfer instructions to each physical location s and d Each individual transfer instruction may include indications of these physical locations s and d. The indications of these physical locations may include address information for the physical locations, as well as electronic routing information to one or more computing devices associated with these physical locations. The electronic routing information may, for example, include an Simple Mail Transfer Protocol (SMTP) email address, Hypertext Transfer Protocol (HTTP) address, File Transfer Protocol (FTP) address, or other routing information applicable to other network transmission protocols.

In one embodiment, the processor accesses memory to transmit each transfer instruction over a network to at least one of: (i) a computing device associated with a source physical location indicated in the transfer instruction; (ii) a computing device associated with a destination physical location indicated in the transfer instruction; and (iii) a computing device associated with a retailer of the item.

To source physical locations s, the processor sends a portion of the transfer instructions for all physical locations s and d (such as an individual transfer instruction) that indicates that source physical location s is to send the actual transfer quantity $t_{sd}$ to the location information of destination physical location d Each individual transfer instruction of the overall transfer instructions may be transmitted by instruction generator module 120 over the network 130 to computing device 140 associated with source physical location s. The individual transfer instruction may include a pick/pack list describing the item generated based on the actual transfer quantity $t_{sd}$ and a shipping label based on the location information of physical locations s and d.

In one embodiment, the shipping label is a pre-paid shipping label. The processor retrieves the cost for shipping one unit of the item $c_{sd}$ from source physical location s to destination physical location d. The processor then calculates the cost for shipping the actual transfer quantity $t_{sd}$ by multiplying the actual transfer quantity $t_{sd}$ by the cost for shipping one unit of the item $c_{sd}$, and purchasing a shipping label at a cost not exceeding that amount. The pre-paid shipping label is then provided as part of the individual transfer instruction. In another embodiment, the individual transfer instruction may include an authorization for employees of the retailer at physical location s to purchase shipping services up to the cost for shipping the actual transfer quantity $t_{sd}c_{sd}$.

In one embodiment, the processor may control one or more remote devices in order to bring about the optimum redistribution. The remote devices include, for example, display devices, printers, and other output devices associated with computing devices 140 and 145 at physical locations involved in transfers of the item. The remote devices may also include an automated warehouse picking and packing system or inventory handling robot at physical locations involved in transfers of the item.

In one embodiment, transmitting the transfer instruction to computing device 140 associated with source physical location s causes a display device to show the pick/pack list, the shipping label, or both. The computing device 140 parses incoming instruction transmissions and determines that they include an instruction to transfer inventory. The computing device then controls the display device to show the pick/pack list, the shipping label, or both.

In one embodiment, transmitting the transfer instruction to computing device 140 associated with source physical location s causes a printer to print the pick/pack list, the shipping label, or both. The computing device 140 parses incoming instruction transmissions and determines that they include an instruction to transfer inventory. The computing device then controls the printer to print the pick/pack list, the shipping label, or both.

Further, in one embodiment, the instruction is configured so as to cause an automated warehouse picking and packing system (such as a robot) to retrieve the actual transfer quantity $t_{sd}$ of the item from inventory at source physical location s. The computing device 140 parses incoming instruction transmissions and determines that they include an instruction to transfer inventory. The computing device 140 then controls the automated warehouse picking and packing system to retrieve the actual transfer quantity $t_{sd}$ of the item from inventory at source physical location s.

To destination physical locations d, the processor sends a portion of the transfer instructions for all physical locations s and d (such as a transfer notification) that indicates that source physical location s will be sending the actual transfer quantity $t_{sd}$ to destination physical location d. This notification may be transmitted by instruction generator module 120 over the network 130 to computing device 145 associated with destination physical location d. The notification may include the actual transfer quantity $t_{sd}$, the description of the item, and tracking information associated with the shipping label.

In one embodiment, transmitting the notification to computing device 145 associated with destination physical location d causes a printer to print the notification. The computing device 145 parses incoming notification transmissions and determines that they include a notification of an inventory transfer. The computing device 145 then controls the printer to print the pick/pack list, the shipping label, or both.

Additionally, the instructions and notifications may be transmitted to computing device(s) 135 associated with a retailer or third-party computing systems 155, for record-keeping, data analytics, re-transmission to computing devices associated with physical locations s and d, or other purposes.

After transmitting the transfer instructions (including the instructions and notifications) to all the source physical locations s and destination physical locations d, as discussed above, processing at process block 525 completes, and processing continues to END block 530, where processing ends.

Specific Improvement to Computer Operation

The specific processes, rules, and formulae described herein allow for (i) the determination of whether or not an efficient redistribution of items can truly be achieved in view of transfer costs, and where an efficient redistribution is possible, (ii) a determination of what the most efficient redistribution actually is, including the actual inter-location transfer quantities, sources, and destinations. In particular, the processes, rules, and formulae for identifying and applying the scaling factor $\alpha^*$ allows a computer to accurately account for the interaction between revenue improvement and transfer costs when redistributing inventory. This was not previously possible in a computing system, because prior systems handle revenue improvement and transfer costs separately, and thus could not accurately account for the interaction between the intertwined factors revenue improvement and transfer costs. From the scaling factor $\alpha^*$, a computer can then prepare instructions to effect a more efficient redistribution than possible from prior systems.

Also, the increased accuracy of computer identification of a better redistribution allowed by the claimed systems and methods is itself an improvement to computer functionality.

Further, human approaches to accounting for the interaction between revenue improvement and transfer costs rely on guesswork, rules-of-thumb, and gut instinct. These are inconsistent and less accurate than the processes and systems described and claimed herein. The processes disclosed herein are not practically performed in the human mind, due at least in part to the complexity of the formulae and processes.

Cloud or Enterprise Embodiments

In one embodiment, the inventory redistribution control system 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment the inventory redistribution control system is a centralized server-side application that provides at least the functions disclosed herein and that is accessed by many users via computing devices/terminals communicating with the computing system 100 (functioning as the server) over a computer network.

Non-Transitory Computer-Readable Medium Embodiments

In one embodiment, one or more of the components described herein are configured as program modules stored in a non-transitory computer readable medium. The program modules are configured with stored instructions that when executed by at least a processor cause a computing device to perform the corresponding function(s) as described herein. Non-transitory computer-readable media expressly exclude transitory propagating signals.

Computing Device Embodiment

Figure 6:
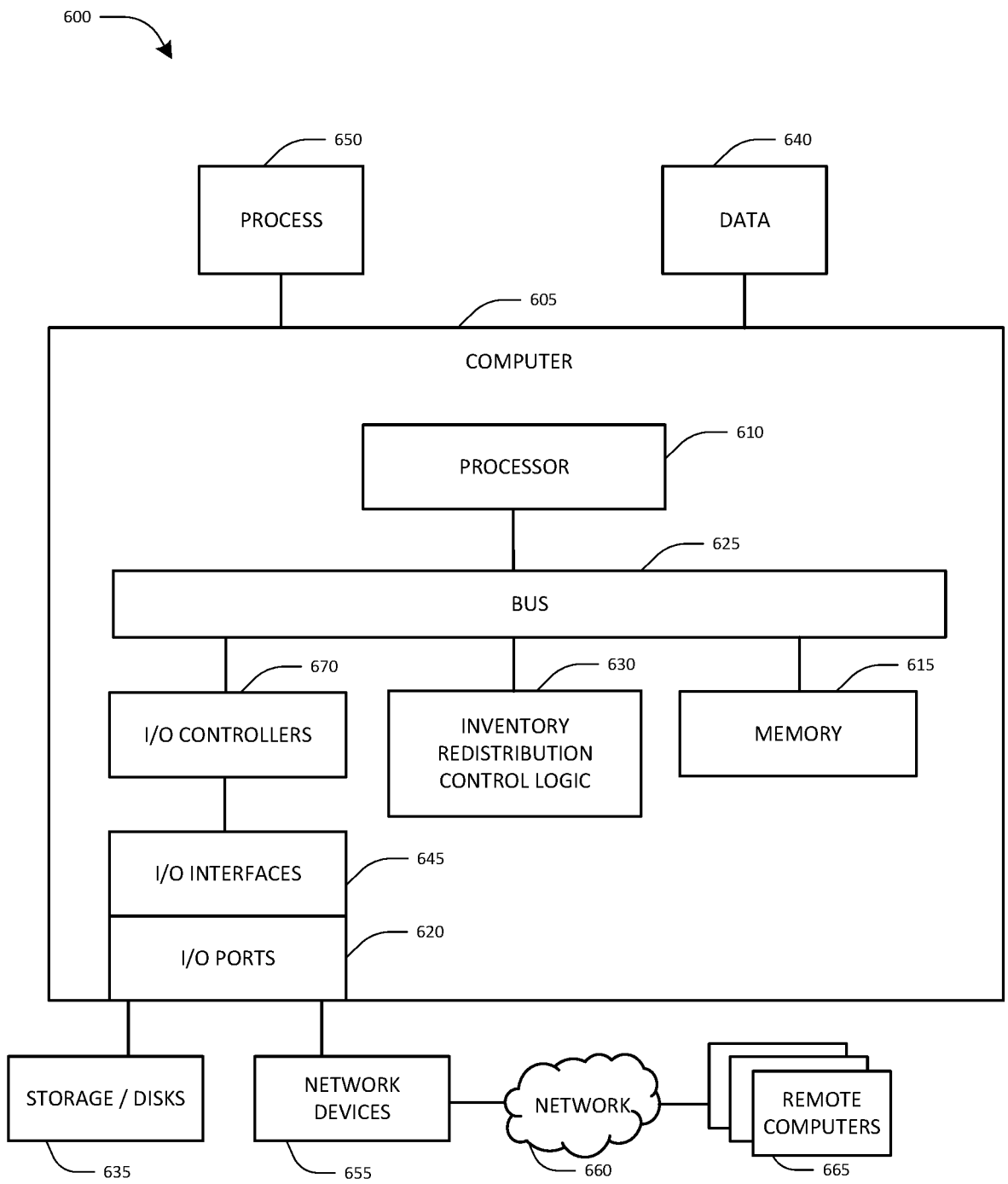
FIG. 6 illustrates an embodiment of a computing system configured with the example systems and/or methods disclosed.

FIG. 6 illustrates an example computing device that is configured and/or programmed with one or more of the example systems and methods described herein, and/or equivalents. The example computing device may be a computer 605 that includes a processor 610, a memory 615, and input/output ports 620 operably connected by a bus 625. In one example, the computer 605 may include inventory redistribution control logic 630 configured to facilitate inventory redistribution control similar to the system and method shown in FIGS. 1-5. In different examples, the logic 630 may be implemented in hardware, a non-transitory computer-readable medium with stored instructions, firmware, and/or combinations thereof. While the logic 630 is illustrated as a hardware component attached to the bus 625, it is to be appreciated that in other embodiments, the logic 630 could be implemented in the processor 610, stored in memory 615, or stored in disk 635.

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to optimize inventory redistribution in accordance with the systems and methods described herein. The means may also be implemented as stored computer executable instructions that are presented to computer 605 as data 640 that are temporarily stored in memory 615 and then executed by processor 610.

Logic 630 may also provide means (e.g., hardware, non-transitory computer-readable medium that stores executable instructions, firmware) for performing inventory redistribution optimization and control.

Generally describing an example configuration of the computer 605, the processor 610 may be a variety of various processors including dual microprocessor and other multi-processor architectures. A memory 615 may include volatile memory and/or non-volatile memory. Non-volatile memory may include, for example, read-only memory (ROM), programmable read-only memory (PROM), erasable programmable read-only memory (EPROM), electrically erasable programmable read-only memory (EEPROM), and so on. Volatile memory may include, for example, random-access memory (RAM), static random-access memory (SRAM), dynamic random-access memory (DRAM), and so on.

A storage disk 635 may be operably connected to the computer 605 via, for example, an input/output (I/O) interface (e.g., card, device) 645 and an input/output port 620. The disk 635 may be, for example, a magnetic disk drive, a solid-state drive, a floppy disk drive, a tape drive, a Zip® drive, a flash memory card, a memory stick, and so on. Furthermore, the disk 635 may be a compact disk (CD) drive, a compact disk read only memory (CD-ROM) drive, a compact disc recordable (CD-R) drive, a compact disc rewritable (CD-RW) drive, a digital versatile/video disc read only memory (DVD ROM) drive, Blu-Ray® drive, and so on. The memory 615 can store a process 650 and/or a data 640, for example. The disk 635 and/or the memory 615 can store an operating system that controls and allocates resources of the computer 605.

The computer 605 may interact with input/output (I/O) devices via the I/O interfaces 645 and the input/output ports 620. Input/output devices may be, for example, a keyboard, a microphone, a pointing and selection device such as a mouse or touch sensor, cameras, video cards, displays, audio cards, speakers or headphones, the disk 635, the network devices 655, and so on. The input/output ports 620 may include, for example, serial ports, parallel ports, and universal serial bus (USB) ports.

The computer 605 can operate in a network environment and thus may be operably connected to the network devices 655 via the I/O interfaces 645, and/or the I/O ports 620. Through the network devices 655, the computer 605 may interact with a network 660 (such as network 130). Through the network, the computer 605 may be logically connected to remote computers 665. Networks with which the computer 605 may interact include, but are not limited to, a local area network (LAN), a wide area network (WAN), and other networks. The computer 605 may manage data communications to and from the I/O interfaces 645 with I/O controllers 670.

The computer 605 may exchange electronic messages with the remote computers over the network 660. Such electronic messages may be provided as emails, short message service (SMS) messages or other types of message using Transmission Control Protocol (TCP)/Internet Protocol (IP) or other communication protocols.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., an application specific integrated circuit (ASIC)), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor and a memory of a computer cause the processor to:
    for each location inventory record of a set of location inventory records,
        retrieve the inventory record from a computing device at a physical location associated with the location inventory record;
        calculate a quantity change for an item that changes a current item quantity to a different item quantity for the location inventory record,
            wherein the quantity change for the item is a function of a remaining number of weeks before the item is to sell out at the physical location, a base demand for the item at the physical location, a constant price elasticity for the item at the physical location, a scalar constant at which there is no net change in the total quantity of the item across the set of location inventory records, and a current item quantity of the location inventory record;
    determine, by the processor accessing the memory,
        (i) a redistribution of the item among the physical locations to effect the quantity change for each location inventory record at a minimum cost, and
        (ii) an overall cost of the redistribution based on the sum of the minimum costs;
    determine a set of possible scaling factors to include one scaling factor that simultaneously and interdependently resolves the quantity changes and the cost of redistribution by satisfying a threshold condition of maximizing a total revenue received from sales of the item when the quantity changes for each location inventory record are scaled by the one scaling factor after deducting the overall cost scaled by the one scaling factor;
    for the one scaling factor that exists that satisfies the threshold condition,
        generate an electronic output including a set of transfer instructions to perform the redistribution of the item with transfer quantities of the item to be transferred between the physical locations scaled by the one scaling factor; and
    transmit each transfer instruction over a network to a computing device associated with a physical location indicated in the transfer instruction to cause the computing device to print a pick/pack list of the item with the transfer quantities scaled by the one scaling factor and to print a shipping label to effect the transfer between physical locations.

2. The non-transitory computer-readable medium of claim 1, wherein the computer-executable instructions further cause the processor to:
    for each location inventory record of a set of location inventory records, determine the quantity change that maximizes income from sales of the item across the set of physical locations without altering a total quantity of the item across the set of location inventory records; and
    store the redistribution as a data structure that indicates for each individual inventory transfer of the redistribution at least (i) a source physical location in the set of physical locations, (ii) a destination physical location in the set of physical locations, and (iii) the transfer quantity of the item between the source physical location and destination physical location.

3. The non-transitory computer-readable medium of claim 2, further comprising instructions that when executed by at least the processor cause the processor to:
    for each location inventory record in the set of location inventory records, classify the physical location associated with location inventory record as belonging (i) to a set of inventory surplus locations if the quantity change is negative, or (ii) to a set of inventory deficit locations if the quantity change is positive;
    and wherein (i) each source physical location of the redistribution always belongs to the set of inventory surplus locations and (ii) each destination physical location of the redistribution always belongs to the set of inventory deficit locations, ensuring that inventory imbalances are not increased.

4. The non-transitory computer-readable medium of claim 1, wherein the calculation of the quantity change for each location inventory record of the set of location inventory records is expressed by a first equation:

$$c_k = \left(\left(\sum_{w=1}^{W_k} b_{kw}\right)^{\frac{-1}{\gamma_k}} \frac{\gamma_k}{-1+\gamma_k}\lambda\right)^{-\gamma_k} - I_k$$

wherein:
    k represents the location inventory record;
    $c_k$ is the quantity change for the location inventory record;
    $W_k$ is the remaining number of weeks before the item is required to sell out at the physical location associated with the location inventory record;
    w is a given week between 1 and $W_k$, inclusive;
    $b_{kw}$ is the base demand for the item at the physical location associated with the location inventory record in the given week;
    $\gamma_k$ is the constant price elasticity for the item at the physical location associated with the location inventory record;
    $\lambda$ is the scalar constant at which there is no net change in the total quantity of the item across the set of location inventory records; and
    $I_k$ is the current item quantity of the location inventory record.

5. The non-transitory computer-readable medium of claim 4, wherein the scalar constant is identified by solving a second equation $$\sum_k \left(\left(\sum_{w=1}^{W_k} b_{kw}\right)^{\frac{1}{\gamma_k}} \frac{\gamma_k}{-1+\gamma_k}\lambda\right)^{-\gamma_k} - I_k = 0$$

for the scalar constant $\lambda$.

6. The non-transitory computer-readable medium of claim 1, wherein the instructions for the determining if a set of possible scaling factors includes one scaling factor further cause the processor to:

solve an equation $$\left[\sum_k \left(\sum_{w=1}^{W_k} b_{kw}\right)^{-\frac{1}{\gamma_k}} \left(-\frac{1}{\gamma_k}+1\right)(I_k + \alpha c_k^*)^{-\frac{1}{\gamma_k}} c_k^*\right] - C = 0$$

for the one scaling factor, wherein:
α represents the one scaling factor;
k represents the location inventory record;
$c_k$ is the quantity change for the location inventory record;
$W_k$ is a remaining number of weeks before the item is required to sell out at the physical location associated with the location inventory record;
w is a given week between 1 and $W_k$, inclusive;
$b_{kw}$ is a base demand for the item at the physical location associated with the location inventory record in the given week;
$\gamma_k$ is a constant price elasticity for the item at the physical location associated with the location inventory record;
λ is a scalar constant at which there is no net change in the total quantity of the item across the set of location inventory records;
$I_k$ is the current item quantity of the location inventory record; and
C is the cost of the minimum-cost shipment; and
if the solution is between zero, non-inclusive, and one, inclusive, provide an indication that the one scaling factor maximizes total revenue.

7. The non-transitory computer-readable medium of claim 6, wherein the instructions for the determining if a set of possible scaling factors includes one scaling factor further cause the computer to, if (i) the solution is zero, or (ii) there is no solution between zero and one, inclusive, provide an indication that there is no profitable redistribution.

8. The non-transitory computer-readable medium of claim 1, further comprising instructions that when executed by at least the processor cause the processor to transmit each transfer instruction over a network to at least one of: (i) a computing device associated with a source physical location indicated in the transfer instruction; (ii) a computing device associated with a destination physical location indicated in the transfer instruction; and (iii) a computing device associated with a retailer of the item.

9. A computer-implemented method, the method comprising:

for each location inventory record of a set of location inventory records,
retrieving the inventory record from a computing device at a physical location associated with the location inventory record;
calculating a quantity change for an item that changes a current item quantity to a different item quantity for the location inventory record,
wherein the quantity change for the item is a function of a remaining number of weeks before the item is to sell out at the physical location, a base demand for the item at the physical location, a constant price elasticity for the item at the physical location, a scalar constant at which there is no net change in the total quantity of the item across the set of location inventory records, and a current item quantity of the location inventory record;
determining
(i) a redistribution of the item among the physical locations to effect the quantity change for each location inventory record at a minimum cost, and
(ii) an overall cost of the redistribution based on the sum of the minimum costs;
determining a set of possible scaling factors to include one scaling factor that simultaneously and interdependently resolves the quantity changes and the cost of redistribution by maximizing a total revenue received from sales of the item when the quantity changes for each location inventory record are scaled by the one scaling factor after deducting the cost scaled by the one scaling factor;
generating an electronic output including a set of transfer instructions to perform the redistribution of the item with transfer quantities of the item to be transferred between the physical locations scaled by the one scaling factor;
transmitting each transfer instruction over a network to a computing device associated with a physical location indicated in the transfer instruction to cause the computing device to print a pick/pack list of the item with the transfer quantities scaled by the one scaling factor and to print a shipping label to effect the transfer between physical locations.

10. The computer-implemented method of claim 9, further comprising:

for each location inventory record of a set of location inventory records, determining the quantity change that maximizes income from sales of the item across the set of physical locations without altering a total quantity of the item across the set of location inventory records; and
storing the redistribution as a data structure that indicates for each individual inventory transfer of the redistribution at least (i) a source physical location in the set of physical locations, (ii) a destination physical location in the set of physical locations, and (iii) the transfer quantity of the item between the source physical location and destination physical location.

11. The computer-implemented method of claim 9, further comprising:

for each location inventory record in the set of location inventory records, classifying, by at least the processor, the physical location associated with location inventory record as belonging (i) to a set of inventory surplus locations if the quantity change is negative, or (ii) to a set of inventory deficit locations if the quantity change is positive; and
wherein (i) each source physical location of the redistribution always belongs to the set of inventory surplus locations and (ii) each destination physical location of the redistribution always belongs to the set of inventory deficit locations, ensuring that inventory imbalances are not increased.

12. The computer-implemented method of claim 9, wherein the calculation of the quantity change for each location inventory record of the set of location inventory records is expressed by a first equation:

$$c_k = \left(\left(\sum_{w=1}^{W_k} b_{kw}\right)^{\frac{-1}{\gamma_k}} \frac{\gamma_k}{-1+\gamma_k}\lambda\right)^{-\gamma_k} - I_k$$

wherein:
  k represents the location inventory record;
  $c_k$ is the quantity change for the location inventory record;
  $W_k$ is the remaining number of weeks before the item is required to sell out at the physical location associated with the location inventory record;
  w is a given week between 1 and $W_k$, inclusive;
  $b_{kw}$ is the base demand for the item at the physical location associated with the location inventory record in the given week;
  $\gamma_k$ is the constant price elasticity for the item at the physical location associated with the location inventory record;
  $\lambda$ is the scalar constant at which there is no net change in the total quantity of the item across the set of location inventory records; and
  $I_k$ is the current item quantity of the location inventory record.

13. The computer-implemented method of claim 9, wherein the scalar constant is identified by solving a second equation $$\sum_k \left[\left(\sum_{w=1}^{W_k} b_{kw}\right)^{\frac{-1}{\gamma_k}} \frac{\gamma_k}{-1+\gamma_k}\lambda\right]^{-\gamma_k} - I_k = 0$$

for the scalar constant $\lambda$.

14. The method of claim 9, further comprising:
solving, by at least the processor, an equation $$\left[\sum_k \left(\sum_{w=1}^{W_k} b_{kw}\right)^{-\frac{1}{\gamma_k}} \left(-\frac{1}{\gamma_k}+1\right)(I_k + \alpha c_k^*)^{-\frac{1}{\gamma_k}} c_k^*\right] - C = 0$$

for the one scaling factor, wherein:
  $\alpha$ represents the one scaling factor;
  k represents the location inventory record;
  $c_k$ is the quantity change for the location inventory record;
  $W_k$ is a remaining number of weeks before the item is required to sell out at the physical location associated with the location inventory record;
  w is a given week between 1 and $W_k$, inclusive;
  $b_{kw}$ is a base demand for the item at the physical location associated with the location inventory record in the given week;
  $\gamma_k$ is a constant price elasticity for the item at the physical location associated with the location inventory record;
  $\lambda$ is a scalar constant at which there is no net change in the total quantity of the item across the set of location inventory records;
  $I_k$ is the current item quantity of the location inventory record; and
  C is the cost of the minimum-cost shipment; and
if the solution is between zero, non-inclusive, and one, inclusive, providing, by at least the processor, an indication that the one scaling factor maximizes total revenue.

15. The computer-implemented method of claim 14, further comprising, if (i) the solution is zero, or (ii) there is no solution between zero and one, inclusive, providing an indication that there is no profitable redistribution.

16. The computer-implemented method of claim 9, further comprising transmitting each transfer instruction over a network to at least one of: (i) a computing device associated with a source physical location indicated in the transfer instruction; (ii) a computing device associated with a destination physical location indicated in the transfer instruction; and (iii) a computing device associated with a retailer of the item.

17. The computer-implemented method of claim 9, wherein the determining if the set of possible scaling factors includes the one scaling factor accounts for both the cost and the total revenue received from sales of the item simultaneously to avoid overly aggressive revenue maximization.

18. The computer-implemented method of claim 9, further comprising controlling one or more remote devices in order to bring about the redistribution.

19. The computer-implemented method of claim 9, wherein each step of the method is executed by a processor accessing memory to (i) perform the step, (ii) retrieve any necessary information, or (iii) store any data calculated, determined, generated, classified, or otherwise created.

20. A computing system, comprising:
  a processor;
  a memory operably connected to the processor;
  a non-transitory computer-readable medium operably connected to the processor and storing computer-executable instructions that when executed by at least the processor cause the computing system to:
    for each location inventory record of a set of location inventory records,
      retrieve the inventory record from a computing device at a physical location associated with the location inventory record;
      calculate a quantity change for an item that changes a current item quantity to a different item quantity for the location inventory record using the processor, and
      update the inventory record in memory to store the quantity change,
        wherein the quantity change for the item is a function of a remaining number of weeks before the item is to sell out at the physical location, a base demand for the item at the physical location, a constant price elasticity for the item at the physical location, a scalar constant at which there is no net change in the total quantity of the item across the set of location inventory records, and a current item quantity of the location inventory record;
    determine a redistribution of the items among the physical locations to effect the quantity change for each location inventory record at a minimum cost
      by using the processor to retrieve from memory the quantity change and location identifier for each location inventory record and
      writing to memory
        (i) the redistribution resulting from providing the location identifiers and quantity changes to a transportation problem solver, and (ii) an overall cost of the redistribution based on the sum of the minimum costs;

store in memory one scaling factor of a set of possible scaling factors that the processor determines simultaneously and interdependently resolves the quantity changes and the cost of redistribution by satisfying a threshold condition of maximizing a total revenue received from sales of the item when the quantity changes for each location inventory record are scaled by the processor by the one scaling factor after deducting by the processor the cost scaled by the processor by the one scaling factor;

for the one scaling factor that exists that satisfies the threshold condition, generate transfer instructions to perform the redistribution of the item in memory, using the processor to scale by the one scaling factor transfer quantities retrieved from the redistribution in memory; and use the processor to transmit each transfer instruction retrieved from memory over a network to a computing device associated with a physical location indicated in the transfer instruction to cause the computing device operate an automated warehouse picking and packing system to retrieve the transfer quantity of the item scaled by the one scaling factor and to print a shipping label to effect the transfer between physical locations.

\* \* \* \* \*